United States Patent
Al et al.

(10) Patent No.: US 10,952,034 B2
(45) Date of Patent: Mar. 16, 2021

(54) MULTICAST SERVICE INFORMATION CHANGE NOTIFICATION METHOD AND APPARATUS

(71) Applicant: ZTE CORPORATION, Shenzhen (CN)

(72) Inventors: Jianxun Al, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 45 days.

(21) Appl. No.: 16/336,776

(22) PCT Filed: Sep. 29, 2017

(86) PCT No.: PCT/CN2017/104572
§ 371 (c)(1),
(2) Date: Jun. 14, 2019

(87) PCT Pub. No.: WO2018/059562
PCT Pub. Date: Apr. 5, 2018

(65) Prior Publication Data
US 2020/0137528 A1  Apr. 30, 2020

(30) Foreign Application Priority Data
Sep. 29, 2016  (CN) .......................... 201610864206.8

(51) Int. Cl.
H04W 4/06  (2009.01)
H04W 48/12  (2009.01)
H04W 72/12  (2009.01)

(52) U.S. Cl.
CPC ............ *H04W 4/06* (2013.01); *H04W 48/12* (2013.01); *H04W 72/1289* (2013.01)

(58) Field of Classification Search
None
See application file for complete search history.

(56) References Cited

U.S. PATENT DOCUMENTS

| 8,902,884 B2 * | 12/2014 | Wang .................. H04W 72/005 370/384 |
| 2005/0286483 A1 | 12/2005 | Lee et al. |
| 2011/0194428 A1 | 8/2011 | Wang et al. |
| 2018/0049006 A1 * | 2/2018 | Hong ...................... H04L 67/32 |
| 2018/0242278 A1 * | 8/2018 | Xu ........................ H04W 16/02 |
| 2018/0249442 A1 * | 8/2018 | Xu ...................... H04W 72/005 |

(Continued)

FOREIGN PATENT DOCUMENTS

| CN | 1954523 A | 4/2007 |
| CN | 101867874 A | 10/2010 |

(Continued)

OTHER PUBLICATIONS

International Search Report for International Application No. PCT/CN2017/104572; Date of Completion: Dec. 12, 2017; dated Dec. 20, 2017; 2 Pages.

*Primary Examiner* — Anh Vu H Ly
(74) *Attorney, Agent, or Firm* — Cantor Colburn LLP

(57) ABSTRACT

A multicast service information change notification method comprises: an access network element sends to a UE a multicast service information update command; and the access network element indicates multicast service information to the UE service.

12 Claims, 5 Drawing Sheets

610

UE receives content of single cell-multicast control channel SC-MCCH information in a carrier scheduling single cell-multicast traffic channel SC-MTCH

620

UE receives the SC-MTCH according to the SC-MCCH information

(56) References Cited

U.S. PATENT DOCUMENTS

| | | | |
|---|---|---|---|
| 2019/0007891 A1* | 1/2019 | Xu | H04W 76/40 |
| 2019/0174474 A1* | 6/2019 | Zhang | H04W 4/06 |
| 2019/0174510 A1* | 6/2019 | Shin | H04L 5/0044 |
| 2019/0182802 A1* | 6/2019 | Yu | H04W 72/1289 |
| 2019/0223197 A1* | 7/2019 | Shin | H04L 1/0031 |
| 2019/0246254 A1* | 8/2019 | Chatterjee | H04L 5/0053 |
| 2020/0037287 A1* | 1/2020 | Zhang | H04W 72/042 |

FOREIGN PATENT DOCUMENTS

| | | |
|---|---|---|
| CN | 101909242 A | 12/2010 |
| CN | 102035807 A | 4/2011 |
| WO | 2011020027 A1 | 2/2011 |
| WO | 2014113968 A1 | 7/2014 |

\* cited by examiner

MULTICAST SERVICE INFORMATION CHANGE NOTIFICATION METHOD AND APPARATUS

CROSS REFERENCE

This application is the 371 application of PCT Application No. PCT/CN2017/104572 filed Sep. 29, 2017, which is based upon and claims priority to Chinese Patent Application No. 201610864206.8, filed on Sep. 29, 2016 the entire contents thereof are incorporated herein by reference.

TECHNICAL FIELD

The present disclosure relates to the field of communication, and more particularly, to a method and apparatus for service information of multicast service and change notification of service information.

BACKGROUND

In the 3rd Generation Partnership Project (3GPP) Long Term Evolution (LTE), single cell point to multipoint (SC-PTM) is introduced, the SC-PTM technology is used to implement transmission of a point-to-multipoint downlink Multimedia Broadcast Multicast Service (MBMS) in a single cell.

In the SC-PTM technology, a Single Cell-Multicast Control Channel (SC-MCCH) is defined.

In the SC-MCCH information, identity of the multicast service and the schedule information of its Single Cell-Multicast Traffic Channel (SC-MTCH) are indicated.

The main purpose of introducing SC-PTM in the Narrow Band-internet of things (NB-IoT) is to provide an efficient software update transmission mechanism for a large number of IoT terminals. There are two possibilities in the software update time, periodicity and abruptness. Periodic software updates could be used for non-emergency update requests, and abrupt software updates are more appropriate for situations where software is required to be updated as quickly as possible, for example to fix security vulnerabilities in the software, etc. Obviously, the time for the abrupt software update is uncertain.

When a network side is required to push emergency software update, it is necessary to notify the UE of the USD information related to the service, and in the related technology protocol, there is no effective mechanism for pushing the USD information in time. On the other hand, if the UE is required to keep detecting change notification of the SC-MCCH information, it is very disadvantageous for the power saving of the UE, since it is meaningless for the UE to receive the change notification of the SC-MCCH information in most cases. For NB-IoT and enhanced Machine-Type Communications (eMTC) UEs, power saving is a key performance requirement.

On the other hand, there are multiple carrier deployment scenarios in NB-IoT or eMTC, that is, SC-MCCH and SC-MTCH could be carried and scheduled for sending in different carriers. However, the capability of the UE is limited by the cost, and the channel signals on different carriers could not be received simultaneously, thus limiting the schedule of the base station, that is, when the change notification of the SC-MCCH or the SC-MCCH information is scheduled, the SC-MTCH could not be scheduled on other carriers simultaneously, otherwise the UE could not receive change notification of the SC-MCCH or SC-MTCH data, thereby causing a problem that some data may be missed or change of the SC-MCCH may not be received.

SUMMARY

The embodiments of the present disclosure provide a method and an apparatus for service information of multicast service and notifying service information change, which are applicable to the notification of the single-cell multicast service information and the SC-MCCH information change of the NB-IoT and the eMTC.

The present disclosure provides the following technical solutions.

A method for notifying service information of multicast service includes:

An access network element sends update indication of multicast service information to a user equipment UE;

The access network element indicates the service information of the multicast service to the user equipment UE.

In an embodiment, the indicating, by the access network element, the service information of the multicast service to a UE includes, but is not limited to, at least one of the following ways:

The access network element indicates the service information of the multicast service in the system information block;

The access network element indicates the service information of the multicast service in single-cell multicast control channel SC-MCCH information;

The access network element indicates the service information of the multicast service in paging message.

In an embodiment, the sending, by the access network element, the update indication of multicast service information to a UE includes one or more of the following cases:

Service identification information of the service information is indicated in the DCI of PDCCH for paging or in the paging message; the service identification information is temporary multicast group identity TMGI, or information obtained by calculating or transforming the TMGI according to a first predetermined rule, which includes low N bits in the TMGI, high N bits of the TMGI, or a result obtained by dividing all bits of the TMGI into N bits per group and performing an logical exclusive OR operation between groups;

Service area identification information of the service information is indicated in the DCI of PDCCH for paging or in the paging message; the service area identification information is SAI or information obtained by calculating or transforming the SAI according to a second predetermined rule, which includes: low N bits in the SAI, high N bits of the SAI, or a result obtained by dividing all bits of the SAI into N bits per group and performing an logical exclusive OR operation between groups;

In an embodiment, the service information of the multicast service indicated by the access network element includes: at least one of the TMGI and the SAI of the multicast service.

In an embodiment, if the service information includes the TMGI, the service information further includes at least one of start time and end time of the multicast service. If the service information includes the SAI, the service information further includes frequency information of the multicast service.

In an embodiment, the method for notifying service information further includes:

The access network element indicates schedule information of the multicast service in the SC-MCCH information.

In an embodiment, the method for notifying service information further includes:

The access network element updates, before or after sending the update indication of the multicast service information to the UE, the system information block including the service information of the multicast service.

In an embodiment, prior to the sending, by the access network element, the update indication of the multicast service information to the UE, the method further includes:

The access network element receives multimedia broadcast multicast MBMS Session Start Request of control plane message sent by a core network element; the control plane message is used to indicate that the access network element completes the update notification of the service information of the MBMS service, indicated by the control plane message, through the paging mechanism.

In an embodiment, when the access network element indicate the service information of the multicast service in the system information block, the access network element sends the update indication of the multicast service information to the UE and indicates the service information of the multicast service to the UE according to one of the following way.

The access network element sends the update indication of the multicast service information in paging occasion (PO) within the previous maximum enhanced discontinuous reception eDRX period, and starts to update the system information block in the next maximum eDRX period thereafter, the updated system information block includes service information S2 of the multicast service; range of the maximum eDRX period is a time interval from a hyper-system frame number H-SFN mod m=0 to H-SFN mod m=m−1, the m is length of the maximum eDRX period or equal to 1024.

The access network element sends the update indication of the multicast service information in paging occasion within a maximum eDRX period, and updates the system information block sent by system information before sending the update indication of the multicast service information, wherein the updated system information block includes service information S2 of the multicast service.

In an embodiment, when the access network element indicates the service information of the multicast service in the single cell multicast control channel SC-MCCH information, the access network element sends the update indication of the multicast service information to the UE and indicates the service information of the multicast service to the UE according to one of the following way.

The access network element sends the update indication of the multicast service information in paging occasion within the previous maximum eDRX period, and starts to update the SC-MCCH information in the next maximum eDRX period thereafter, the updated SC-MCCH information SM-2 includes service information S2 of the multicast service; range of the maximum eDRX period is a time interval from a H-SFN mod m=0 to H-SFN mod m=m−1, m is length of the maximum eDRX period or equal to 1024.

The access network element sends the update indication of the multicast service information in paging occasion within one maximum eDRX period, and updates SC-MCCH information SM-1 sent through the SC-MCCH before sending the update indication of the multicast service information, wherein the SC-MCCH information SM-1 includes service information S2 of the multicast service.

A method for notifying service information of multicast service includes:

A user equipment UE receives update indication of multicast service information and service information of multicast service from an access network element.

The UE receives the multicast service from the access network element according to the service information of the multicast service.

In an embodiment, the receiving, by the UE, service information of multicast service from the access network element includes, but is not limited to, at least one of the following ways:

The UE receives the service information of the multicast service in the system information block;

The UE receives the service information of the multicast service in single-cell multicast control channel SC-MCCH information;

The UE receives the service information of the multicast service in the paging message.

In an embodiment, the receiving, by the UE, the update indication of multicast service information from the access network element includes, but is not limited to, at least one or more of the following cases.

One bit of information is received by the UE in downlink control information DCI of physical downlink control channel PDCCH for paging or in paging message; if this UE saves the service information of any multicast service, this UE is a target UE indicated by the update indication of the multicast service information;

Service identification information of the service information is received by the UE in the DCI of PDCCH for paging or in the paging message; the service identification information is temporary multicast group identity TMGI or information obtained by calculating or transforming the TMGI according to the first predetermined rule, which includes: low N bits in the TMGI, high N bits of the TMGI, or a result obtained by dividing all bits of the TMGI into N bits per group and performing an logical exclusive OR operation between groups; If the TMGI in the service information saved by the UE matches the TMGI in the service identification information, or if the result obtained by calculating or transforming the TMGI saved by the UE according to the first predetermined rule is the same as the service identification information, then the UE is a target UE indicated by the update indication of the multicast service information;

Service area identification information of the service information is received by the UE in the DCI of PDCCH for paging or in the paging message; the service area identification information is service area identity SAI or information obtained by calculating or transforming the SAI according to the second predetermined rule, which includes: low N bits in the SAI, high N bits of the SAI, or result obtained by dividing all bits of the SAI into N bits per group and performing an logical exclusive OR operation between groups; If the SAI in the service information saved by the UE matches the SAI in the service identification information, or if the result obtained by calculating or transforming the SAI saved by the UE according to the second predetermined rule is the same as the service identification information, then the UE is a target UE indicated by the update indication of the multicast service information;

In an embodiment, the receiving, by the UE according to the service information of the multicast service, the multicast service from the access network element includes:

When the UE is the target UE, the service information S1 saved by the UE is compared with the obtained service information S2. If the service information S1 matches S2, the UE receives the multicast service according to the service information S2.

The matching of the service information S1 and S2 may refer to:

If the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, when the UE receives the service information of the multicast service in the system information block, the UE receives the service information of the multicast service from the access network element according to one of the following ways.

The UE receives updated system information block at the time of the first hyper-system frame number H-SFN mod m=0 after time when the update indication of the multicast service information is received; m is length of the maximum enhanced discontinuous reception eDRX period or equal to 1024.

The UE immediately receives the system information block after receiving the update indication of the multicast service information.

In an embodiment, when the UE receives the service information of the multicast service in the SC-MCCH information, the UE receives the service information of the multicast service from the access network element according to one of the following ways:

The UE receives SC-MCCH information SM-1 at the time of the first H-SFN mod m=0 after time when the update indication of the multicast service information is received; m is length of the maximum eDRX period or equal to 1024.

The UE immediately receives the SC-MCCH information SM-1 after receiving the update indication of the multicast service information.

In an embodiment, when the UE receives the service information of the multicast service in the system information block, the receiving, by the UE according to the service information S2, the multicast service from the access network element includes one or more of the following ways.

If start time of the multicast service is carried in the service information S2, the UE receives change notification of the SC-MCCH information or the SC-MCCH information according to the start time to obtain schedule information of the multicast service.

If start time of the multicast service is not carried in the service information S2, the UE starts to receive change notification of the SC-MCCH information or the SC-MCCH information from the next SC-MCCH repetition period after the time when the updated system information block is received, to obtain schedule information of the multicast service.

The UE starts to receives update notification of the SC-MCCH or the SC-MCCH information at specific time to obtain schedule information of the multicast service, the specific time is time of the next H-SFN mod m=0 after the time when the UE receives the updated system information block, the m is the length of maximum eDRX period in the cell;

In an embodiment, when the UE receives the service information of the multicast service in the SC-MCCH information, the receiving, by the UE according to the service information S2, the multicast service from the access network element includes one or more combination of the following ways.

If the start time of the multicast service is carried in the service information S2, the UE receives at least one of change notification of the SC-MCCH information and the SC-MCCH information SM-2 according to the start time to obtain the schedule information of the multicast service;

The UE starts to receive at least one of the update notification of the SC-MCCH and the SC-MCCH information SM-2 at specific time, the specific time is the next SC-MCCH modification period starting from or after next H-SFM mod m=0 after the time of receiving the SC-MCCH information SM-1, the m is length of the maximum eDRX period in the cell or equal to 1024; or, the UE receives the change notification of the SC-MCCH information or the SC-MCCH information SM-2 starting from the next SC-MCCH modification period after the time when the SC-MCCH information SM-1 is received;

If the schedule information of the multicast service is carried in the SC-MCCH information SM-1, then the UE receives the SC-MTCH of the multicast service from the SC-MTCH scheduling period of the first multicast service from or after the time of next H-SFN mod m=0, the m is length of the maximum eDRX period in the cell or equal to 1024; or, the UE starts to receive the SC-MTCH of the multicast service at start time of the next SC-MCCH period after time of receiving the SC-MCCH information SM-1.

If frequency information is indicated in the SC-MCCH information SM-1, the UE firstly performs cell reselection and performs reselection with the indicated frequency as the highest priority frequency.

In an embodiment, when the UE receives the service information of the multicast service the in the paging message, the receiving, by the UE according to the service information S2, the multicast service from the access network element includes one or more of the following ways.

If the start time of the multicast service is carried in the service information S2, the UE receives at least one of the change notification of SC-MCCH information and the SC-MCCH information SM-2 according to the start time to obtain the schedule information of multicast service;

The UE starts to receive at least one of the update notification of the SC-MCCH and the SC-MCCH information SM-2 at specific time, the specific time is time of the next H-SFN mod m=0, the m is length of the maximum eDRX period in the cell or equal to 1024, that is, the change notification of the SC-MCCH information or the SC-MCCH information SM-2 starts to be received in SC-MCCH modification period from or after this time.

In an embodiment, the method for notifying service information further includes:

If the frequency information of the multicast service is carried in the service information of the multicast service, the UE performs cell reselection according to the frequency information.

A method for notifying service information change of multicast service includes:

An access network element send, in downlink control information DCI of physical downlink control channel PDCCH scheduling single cell-multicast traffic channel SC-MTCH, or medium access control MAC protocol data unit PDU carrying SC-MTCH data, change notification of single-cell multicast control channel SC-MCCH information.

In an embodiment, the content indicated by the access network element in the DCI of PDCCH scheduling the SC-MTCH, or the MAC PDU carrying the SC-MTCH data includes one or more combinations of the following content:

A one-bit indicator is used to indicate whether there is update of SC-MCCH information.

A one-bit indicator is used to indicate whether update of the SC-MCCH information is related to the SC-MTCH, or to indicate whether the SC-MCCH information has updated content related to the SC-MTCH.

A one-bit indicator is used to indicate whether there is updated content of the SC-MCCH information irrelevant to the SC-MTCH.

In an embodiment, the access network element sends the change notification of the SC-MCCH information in one or more of following cases.

When SC-MCCH information is changed, the access network element indicates, in the DCI of PDCCH scheduling the SC-MTCH, or the MAC PDU carrying the SC-MTCH data, whether the SC-MCCH information is changed.

When configuration information related to the SC-MTCH is changed in the SC-MCCH information, including: schedule information of the SC-MTCH, configuration information of MBMS service corresponding to the SC-MTCH, and neighboring area configuration information of the MBMS service related to the SC-MTCH; the access network element indicates, in the DCI of PDCCH scheduling the SC-MTCH, or the MAC PDU carrying the SC-MTCH data, whether content of the SC-MCCH information has change of content related to the SC-MTCH.

When the content of the SC-MCCH information irrelevant to the SC-MTCH is changed, the access network element indicates, in the DCI of PDCCH scheduling SC-MTCH, or the MAC PDU carrying the SC-MTCH data, that there is updated content of the SC-MCCH information irrelevant to the SC-MTCH.

In an embodiment, timing at which the access network element sends change notification of the SC-MCCH information includes one or more of:

A SC-MCCH modification period in which the SC-MCCH information is changed;

A SC-MCCH modification period prior to a SC-MCCH modification period in which the SC-MCCH information is changed.

In an embodiment, the sending, by the access network element in DCI of PDCCH scheduling SC-MTCH, change notification of the SC-MCCH information includes:

The access network element sends the DCI of PDCCH that does not indicate schedule information of the PDSCH carrying the SC-MTCH one or more times, but indicates the change notification of the SC-MCCH information in this DCI; the DCI of PDCCH is scrambled by using RNTI that schedules the SC-MTCH, and is scheduled for sending by using configuration of scheduling period of the SC-MTCH.

In an embodiment, the sending, by the access network element in MAC PDU carrying SC-MTCH data, change notification of the SC-MCCH information includes:

The access network element sends MAC PDU without carrying SC-MTCH data one or more times, but the change notification of the SC-MCCH information is indicated in the MAC PDU.

A method for notifying service information change of multicast service includes:

A user equipment UE receives change notification of single-cell multicast control channel SC-MCCH information.

The UE receives the SC-MCCH information according to the change notification of SC-MCCH information.

In an embodiment, the receiving, by the UE, the SC-MCCH information according to the received change notification of SC-MCCH information includes:

The UE receives, in a carrier carrying SC-MCCH, the SC-MCCH information in a SC-MCCH modification period corresponding to time of receiving the change notification of the SC-MCCH information, or in a SC-MCCH modification period after time of receiving the change notification of the SC-MCCH information.

In an embodiment, the receiving, by the UE, the SC-MCCH information according to the received change notification of SC-MCCH information includes:

The UE receives, when the SC-MCCH and SC-MTCH are on different carriers, update information of the SC-MCCH in agreed SC-MCCH modification period after receiving the change notification of SC-MCCH information.

In an embodiment, the receiving, by the UE, the SC-MCCH information according to the received change notification of SC-MCCH information includes:

The UE receives, when SC-MCCH information scheduling conflicts with SC-MTCH scheduling resource that the UE receives currently in time-domain, the SC-MCCH information preferentially at least in the following cases:

When the change notification of SC-MCCH information indicates that change of content of the SC-MCCH information is related to the SC-MTCH, when MBMS service corresponding to the SC-MTCH is stopped, or when neighboring area information of the MBMS service corresponding to the SC-MTCH is changed.

A method for notifying service information change of multicast service includes:

An access network element sends content of single-cell multicast control channel SC-MCCH information in a carrier scheduling single-cell multicast traffic channel SC-MTCH, and the SC-MCCH and the SC-MTCH are respectively carried and scheduled for sending on different carriers.

In an embodiment, the content of the SC-MCCH information sent by the access network element in the carrier scheduling the SC-MTCH includes one or more of the following cases:

The content of SC-MCCH information is the same as content of the SC-MCCH information carried by the SC-MCCH sent in the cell, and includes at least schedule information of all services that are currently sent in the cell;

The content of the SC-MCCH information related to the SC-MTCH includes one or more of: schedule information related to the SC-MTCH, identification information of MBMS service corresponding to this SC-MTCH, and neighboring area configuration information related to the MBMS service.

In an embodiment, the content of the SC-MCCH information sent by the access network element includes at least one of the following ways:

In the first way: the access network element sends DCI of physical downlink control channel PDCCH in scheduling period of the SC-MTCH, and the DCI of the PDCCH is scrambled by using dedicated RNTI, the DCI scrambled by the dedicated RNTI indicates schedule information of physical downlink shared channel PDSCH carrying message M;

In the second way: the access network element sends DCI of PDCCH in the scheduling period for scheduling the SC-MTCH, and the DCI of the PDCCH is scrambled by using a RNTI that schedules the SC-MTCH; the access network element indicates that the content carried by the scheduled PDSCH is message M in the DCI;

In the third way: the access network element sends the content of the SC-MCCH information by using a medium access control MAC layer control element CE; the content of the SC-MCCH information is encapsulated in the MAC CE, and the MAC CE is in a MAC protocol data unit PDU carrying the SC-MTCH data;

In the fourth way: message M, including the content of the SC-MCCH information, is carried in logical channel SC-MCCH by the access network element, and SC-MCCH carrying the message M and SC-MTCH carrying service data multiplex MAC PDU by MAC layer multiplexing;

In the first way and the second way, the message M includes the content of the SC-MCCH information; the message M is carried by the logical channel SC-MCCH.

In an embodiment, in the first way and the second way, the number of repeated sending of the DCI of the PDCCH is indicated by a system information block and the SC-MCCH information; the number of repetition of the PDSCH carrying the message M is indicated by the system information block, the SC-MCCH information, or the DCI of the PDCCH.

A method for notifying service information change of multicast service includes:

A User equipment UE receives content of single cell-multicast control channel SC-MCCH information in a carrier scheduling single cell-multicast traffic channel SC-MTCH.

In an embodiment, the receiving, by the UE in a carrier scheduling SC-MTCH, content of SC-MCCH information includes at least one of the following ways:

When the UE detects the DCI of PDCCH scrambled by dedicated RNTI in scheduling period of SC-MTCH, it determines that the content carried by PDSCH scheduled by the DCI is message M, the scheduling of the message M is treated as performing process of inactivity timer of the message M in a same way as one scheduling of SC-MTCH data, the message M includes part or all of the content of SC-MCCH information;

When the UE detects that this scheduling content indicated by the DCI of PDCCH scheduling the SC-MTCH is message M in the scheduling period of SC-MTCH, it is determined that this scheduling content is the message M, the scheduling of the message M is treated as performing the process of inactivity timer of the message M in a same way as one scheduling of the SC-MTCH data;

The UE receives the content of SC-MCCH information by receiving a medium access control MAC protocol data unit PDU of the SC-MTCH data;

After receiving the updated content of SC-MCCH information, the UE applies the content of the received updated SC-MCCH information after the time boundary of the next SC-MCCH modification period.

A method for notifying service information of multicast service includes:

the core network element indicates, in multimedia broadcast multicast MBMS session start request of control plane message, that MBMS indicated in the control plane message has at least one of the following characteristics:

The MBMS service is a push type.

Updated notification of MBMS service information is required to be completed by a paging mechanism.

The MBMS service is an abrupt type.

The core network element sends the MBMS session start request to an access network element.

In an embodiment, the method for notifying the service information further includes:

The core network element indicates parameter of the MBMS service in the MBMS session start request; the parameter includes but is not limited to one or more of: start time, SAI, and frequency information.

In an embodiment, the MBMS session start request is used to indicate that the access network element is processed according to the following way.

By scheduling the downlink control information DCI of the paging message or the paging message, in paging occasion within range of a hyper-system frame number H-SFN mod m=0 to H-SFN mod m=m−1, the user equipment UE is indicated to receive SC-MCCH information starting at time of the next H-SFN mod m=0 after time of receiving this DCI or the paging message; schedule information of the multicast service is indicated in the SC-MCCH information; the m is the maximum value of the eDRX period in the cell, or equal to 1024.

An apparatus for notifying service information of multicast service set in an access network element includes:

A first sending module is configured to send update indication of multicast service information to a user equipment UE.

A first indication module is configured to indicate service information of multicast service to the UE.

An apparatus for notifying service information of multicast service set in a user equipment includes:

A first receiving module is configured to receive update indication of multicast service information and service information of multicast service from an access network element.

A seconding module is configured to receive the multicast service from the access network element based on the service information of the multicast service.

An apparatus for notifying the service information change of multicast service set in an access network element includes:

A second sending module is configured to send change notification of single cell-multicast control channel SC-MCCH information in downlink control information DCI of physical downlink control channel PDCCH scheduling single cell-multicast traffic channel SC-MTCH, or medium access control MAC protocol data unit PDU carrying SC-MTCH data.

An apparatus for notifying service information change of multicast service set in a user equipment includes:

A third receiving module is configured to receive change notification of single cell-multicast control channel SC-MCCH information.

A fourth receiving module is configured to receive the SC-MCCH information according to the change notification of SC-MCCH information.

An apparatus for notifying service information change of multicast service set in an access network element includes:

A third sending module is configured to send content of single cell-multicast control channel SC-MCCH information in a carrier scheduling single cell-multicast traffic channel SC-MTCH, and the SC-MCCH and the SC-MTCH are respectively carried and scheduled for sending on different carriers.

An apparatus for notifying service information change of multicast service set in a user equipment includes:

A fifth receiving module is configured to receive content of single cell-multicast control channel SC-MCCH information in a carrier scheduling single cell-multicast traffic channel SC-MTCH.

An apparatus for notifying service information of multicast service set in a core network element includes:

The second indication module is configured to indicate, in MBMS session start request of control plane message, that multimedia broadcast multicast service MBMS indicated in the control plane message has at least one of the following characteristics:

The MBMS service is a push type.

Updated notification of MBMS service information is required to be completed by a paging mechanism.

The MBMS service is an abrupt type.

The fourth sending module is configured to send the MBMS session start request to an access network element.

The embodiments of the present disclosure could enable the UE to know the change of the multicast service in time.

A storage medium is configured to store program codes for executing the method described in any of the above.

Other characteristics and advantages of the present disclosure will be described in the following specification, and will be apparent partly from the specification, or will be understood by implementing the embodiments of the present disclosure. The objective and other advantages of the present disclosure may be implemented and obtained by the specially indicated structure in the specification, claims and the accompany figures.

BRIEF DESCRIPTION OF THE DRAWINGS

The accompanying drawings, which provide a further understanding of technical scheme of the disclosure and constitute a part of specification, explain the technical scheme of the disclosure together with the embodiment(s) of the disclosure and do not limit the disclosure.

DETAILED DESCRIPTION

Figure 1:
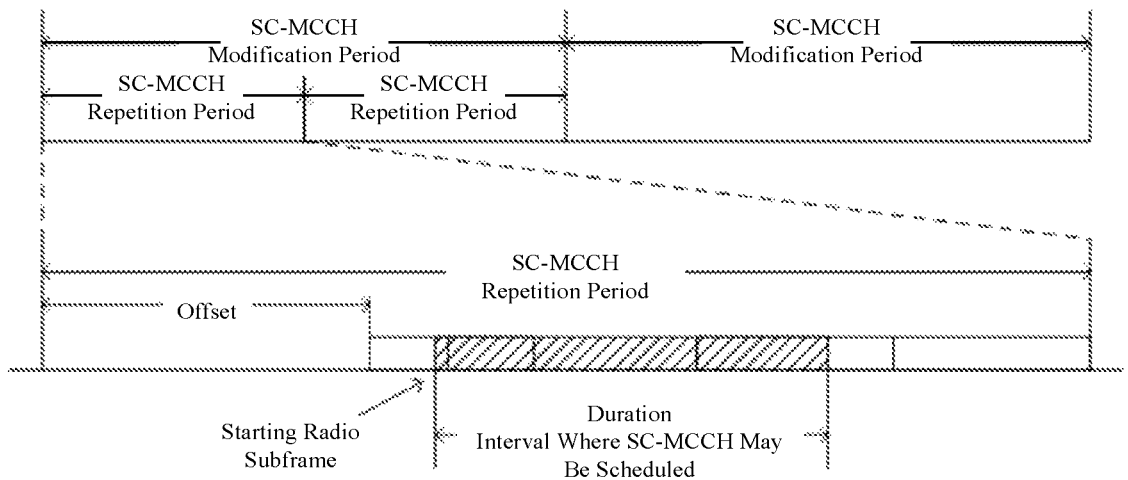
FIG. 1 is a schematic diagram illustrating SC-MCCH scheduling and modification period in the related art.

In order to make objectives, technical schemes and advantages of the present disclosure more clear, the embodiments of present disclosure will be described in details with reference to accompanying drawings hereinafter. It should be noted that, in the case of no conflict, the embodiments in the present application and the features in the embodiments may be arbitrarily combined with each other.

The steps illustrated in the flowchart of the figures may be executed in a computer system such as a set of computer executable instructions. Also, although logical sequences are shown in the flowcharts, in some cases the steps shown or described may be performed in a different order than the ones described herein.

In the MBMS service of the 3GPP, the network side indicates information related to the MBMS service of the User Equipment (UE) through the User Service Description (USD). This information include: Temporary Multicast Group Identity (TMGI), start time and end time of the service, the Service Area Identity (SAI) for sending the service, and the radio information (frequency) for sending the service. The network side sends the USD information of the MBMS service to the UE through communication manner of the application stratum, and the communication manner of application stratum is relative to the access stratum (AS) of the radio access network. The common communication manner of application stratum includes that the USD is sent to the UE through a mechanism such as a HyperText Transfer Protocol (HTTP) or a Short Message Service (SMS) and the like.

In the SC-PTM technology, the SC-MCCH is a logical channel for carrying the SC-MCCH information, the schedule information of the MBMS service transmitted by the UE, which is indicated by the access network element through the SC-MCCH information, on the radio interface in the SC-PTM mode is used by the UE to receive the MBMS service data required to be received on the radio interface. The schedule information of the SC-MTCH indicated in the SC-MCCH information includes length of scheduling period, starting position and length of a scheduling window, and the length of an inactivity timer. The access network element is scheduled in the scheduling window within the scheduling period of the SC-MTCH. The UE receives this SC-MTCH according to this schedule information.

The access network element indicates the change of the SC-MCCH information to UE through a change notification mechanism for SC-MCCH when the SC-MCCH information is updated. The UE could learn that the SC-MCCH information is changed by using this change notification mechanism, so that the SC-MCCH information could be received to detect whether the schedule information of the MBMS service of interest is carried in the SC-MCCH information, and if yes, the UE starts to receive data of the MBMS service based on the schedule information.

In the related technology, SC-MCCH modification period is defined, and the SC-MCCH information starts to be updated only at boundary of the SC-MCCH modification period. In the change notification mechanism for SC-MCCH, before the updated SC-MCCH information is sent, the access network element indicates the change of the SC-MCCH information through Downlink Control Information (DCI) of Physical Downlink Control Channel (PDCCH). The DCI for the change notification of the SC-MCCH information is scrambled by using a dedicated scrambling code (SC-N-RNTI).

As shown in FIG. 1, FIG. 1 is a schematic diagram illustrating SC-MCCH modification period and scheduling, one SC-MCCH modification period may include multiple SC-MCCH repetition periods, such as two in FIG. 1; in one SC-MCCH repetition period, there is an offset between a start point of a starting radio subframe and a start point of the repetition period. A slope filling portion in FIG. 1 is duration, and is an interval where the SC-MCCH may be scheduled.

Figure 2:
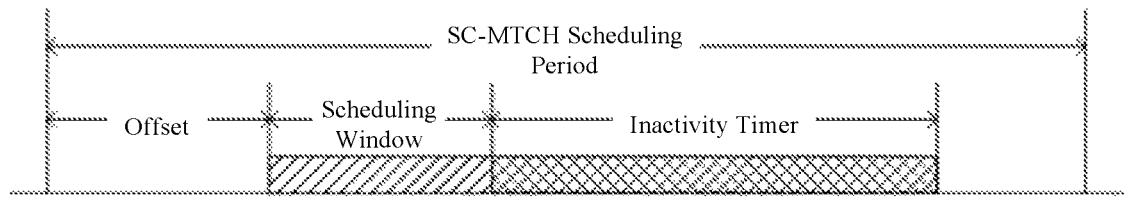
FIG. 2 is a schematic diagram illustrating an SC-MTCH scheduling.

As shown in FIG. 2, FIG. 2 is a schematic diagram illustrating a SC-MTCH scheduling period, in one SC-MTCH scheduling period, there is an offset between a start point of a scheduling window (Onduration) and a start point of the repetition period. A slope filling portion in FIG. 1 is a scheduling window, and a grid line filling portion is an inactivity timer.

Figure 3:
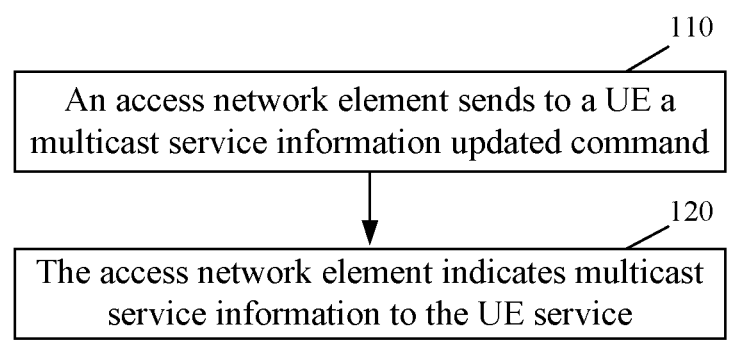
FIG. 3 is a flowchart illustrating a first method for notifying service information of multicast service applied to an access network element side according to an embodiment of the present disclosure.

As shown in FIG. 3, a first method for notifying service information of multicast service provided by an embodiment of the present disclosure is applied to the access network element side, including steps 110-120.

In step 110, an access network element sends update indication of multicast service information to a UE.

In step 120, the access network element indicates the service information of the multicast service to the UE.

In an embodiment, the indicating, by the access network element, the service information of the multicast service to the UE includes, but is not limited to, at least one of the following ways:

The access network element indicates the service information of the multicast service in the system information block;

The access network element indicates the service information of the multicast service in the SC-MCCH information;

The access network element indicates the service information of the multicast service in the paging message.

In an embodiment, the sending, by the access network element, update indication of multicast service information to a UE includes, but is not limited to, one or more of the following cases.

One bit of information is sent in DCI of PDCCH for paging or in paging mess age;

Service identification information of the service information is indicated in the DCI of PDCCH for paging or in the paging message; the service identification information is TMGI or information obtained by calculating or transforming the TMGI according to a first predetermined rule, which includes but is not limited to: low N bits in the TMGI, high N bits of the TMGI, or a result obtained by dividing all bits of the TMGI into N bits per group and performing an logical exclusive OR operation between groups;

Service area identification information of the service information is indicated in the DCI of PDCCH for paging or in the paging message; the service area identification information is SAI or information obtained by calculating or transforming the SAI according to a second predetermined rule, which includes but is not limited to: low N bits in the SAI, high N bits of the SAI, or a result obtained by dividing all bits of the SAI into N bits per group and performing an logical exclusive OR operation between groups;

In an embodiment, the service information of the multicast service indicated by the access network element includes, but is not limited to: at least one of the TMGI and the SAI of the multicast service.

In this embodiment, if the service information includes the TMGI, the service information further includes at least one of start time and end time of the multicast service. If the service information includes the SAI, the service information further includes frequency information for sending the multicast service.

In an embodiment, the method for notifying service information further includes:

The access network element indicates schedule information of the multicast service in the SC-MCCH information.

In an embodiment, the method for notifying service information further includes:

The access network element updates, before or after sending the update indication of the multicast service information to the UE, the system information block including the service information of the multicast service.

In an embodiment, prior to the sending, by the access network element, the update indication of the multicast service information to the UE, the method further includes:

The access network element receives MBMS Session Start Request of control plane message sent by a core network element; the control plane message is used to indicate that the access network element completes the update notification of the service information of the MBMS service, indicated by the control plane message, through the paging mechanism.

In an embodiment, when the access network element indicate the service information of the multicast service in the system information block, the access network element sends the update indication of the multicast service information to the UE and indicates the service information of the multicast service to the UE according to one of the following way.

The access network element sends the update indication of the multicast service information in paging occasion (PO) within the previous maximum enhanced discontinuous reception eDRX period, and starts to update the system information block in the next maximum eDRX period thereafter, the updated system information block includes service information S2 of the multicast service; range of the maximum eDRX period is a time interval from a hyper-system frame number H-SFN mod m=0 to H-SFN mod m=m−1, the m is length of the maximum eDRX period or equal to 1024.

The access network element sends the update indication of the multicast service information in paging occasion within a maximum eDRX period, and updates the system information block sent by system information before sending the update indication of the multicast service information, wherein the updated system information block includes service information S2 of the multicast service.

In an embodiment, when the access network element indicates the service information of the multicast service in the single cell multicast control channel SC-MCCH information, the access network element sends the update indication of the multicast service information to the UE and indicates the service information of the multicast service to the UE according to one of the following way.

The access network element sends the update indication of the multicast service information in paging occasion within the previous maximum eDRX period, and starts to update the SC-MCCH information in the next maximum eDRX period thereafter, the updated SC-MCCH information SM-2 includes service information S2 of the multicast service; range of the maximum eDRX period is a time interval from a H-SFN mod m=0 to H-SFN mod m=m−1, m is length of the maximum eDRX period or equal to 1024.

The access network element sends the update indication of the multicast service information in paging occasion within one maximum eDRX period, and updates SC-MCCH information SM-1 sent through the SC-MCCH before sending the update indication of the multicast service information, wherein the SC-MCCH information SM-1 includes service information S2 of the multicast service.

Figure 4:
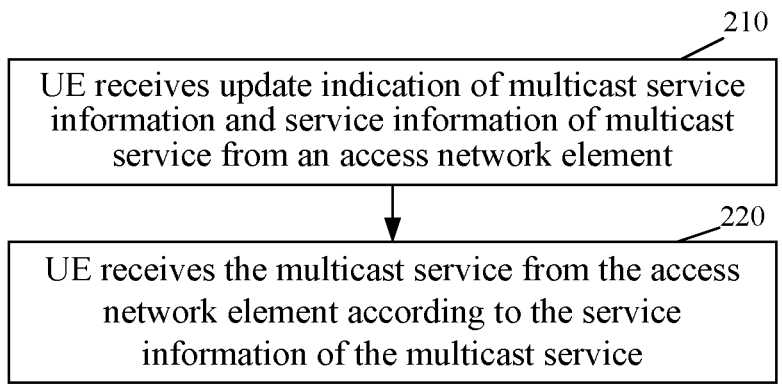
FIG. 4 is a flowchart illustrating a first method for notifying service information of multicast service applied to a UE side according to an embodiment of the present disclosure.

As shown in FIG. 4, a first method for notifying service information of multicast service provided by an embodiment of the present disclosure is applied to a UE side, including steps 210-220.

In step 210, a UE receives update indication of multicast service information and service information of multicast service from an access network element.

In step 220, the UE receives the multicast service from the access network element according to the service information of the multicast service.

In an embodiment, the receiving, by the UE, service information of multicast service from the access network element includes, but is not limited to, at least one of the following ways:

The UE receives the service information of the multicast service in the system information block;

The UE receives the service information of the multicast service in SC-MCCH information;

The UE receives the service information of the multicast service in the paging message.

In an embodiment, the receiving, by the UE, the update indication of multicast service information from the access network element includes, but is not limited to, at least one or more of the following cases.

One bit of information is received by the UE in DCI of PDCCH for paging or in paging message; if this UE saves the service information of any multicast service, this UE is a target UE indicated by the update indication of the multicast service information;

Service identification information of the service information is received by the UE in the DCI of PDCCH for paging or in the paging message; the service identification information is TMGI or information obtained by calculating or transforming the TMGI according to the first predetermined rule, which includes but is not limited to: low N bits in the TMGI, high N bits of the TMGI, or a result obtained by dividing all bits of the TMGI into N bits per group and performing an logical exclusive OR operation between groups; If the TMGI in the service information saved by the UE matches the TMGI in the service identification information, or if the result obtained by calculating or transforming the TMGI saved by the UE according to the first predetermined rule is the same as the service identification information, then the UE is a target UE indicated by the update indication of the multicast service information;

Service area identification information of the service information is received by the UE in the DCI of PDCCH for paging or in the paging message; the service area identification information is SAI or information obtained by calculating or transforming the SAI according to the second predetermined rule, which includes but is not limited to: low N bits in the SAI, high N bits of the SAI, or a result obtained by dividing all bits of the SAI into N bits per group and performing an logical exclusive OR operation between groups; If the SAI in the service information saved by the UE matches the SAI in the service identification information, or if the result obtained by calculating or transforming the SAI saved by the UE according to the second predetermined rule is the same as the service identification information, then the UE is a target UE indicated by the update indication of the multicast service information;

In an embodiment, the receiving, by the UE according to the service information of the multicast service, the multicast service from the access network element includes:

When the UE is the target UE, the service information S1 saved by the UE is compared with the obtained service information S2. If the service information S1 matches S2, the UE receives the multicast service according to the service information S2.

The matching of the service information S1 and S2 may refer to:

If the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, when the UE receives the service information of the multicast service in the system information block, the UE receives the service information of the multicast service from the access network element according to one of the following ways.

The UE receives updated system information block at the time of the first hyper-system frame number H-SFN mod m=0 after time when the update indication of the multicast service information is received; m is length of the maximum enhanced discontinuous reception eDRX period or equal to 1024.

The UE immediately receives the system information block after receiving the update indication of the multicast service information.

In an embodiment, when the UE receives the service information of the multicast service in the SC-MCCH information, the UE receives the service information of the multicast service from the access network element according to one of the following ways:

The UE receives SC-MCCH information SM-1 at the time of the first H-SFN mod m=0 after time when the update indication of the multicast service information is received; m is length of the maximum eDRX period or equal to 1024.

The UE immediately receives the SC-MCCH information SM-1 after receiving the update indication of the multicast service information.

In an embodiment, when the UE receives the service information of the multicast service in the system information block, the receiving, by the UE according to the service information S2, the multicast service from the access network element includes one or more of the following ways.

If start time of the multicast service is carried in the service information S2, the UE receives change notification of the SC-MCCH information or the SC-MCCH information according to the start time to obtain schedule information of the multicast service.

If start time of the multicast service is not carried in the service information S2, the UE starts to receive change notification of the SC-MCCH information or the SC-MCCH information from the next SC-MCCH repetition period after the time when the updated system information block is received, to obtain schedule information of the multicast service.

The UE starts to receives update notification of the SC-MCCH or the SC-MCCH information at specific time to obtain schedule information of the multicast service, the specific time is time of the next H-SFN mod m=0 after the time when the UE receives the updated system information block, the m is the length of maximum eDRX period in the cell; mod represents modulo operation.

In an embodiment, the method further includes:

If the frequency information of the multicast service is carried in the service information of the multicast service, the UE performs cell reselection according to the frequency information.

In an embodiment, when the UE receives the service information of the multicast service in the SC-MCCH information, the receiving, by the UE according to the service information S2, the multicast service from the access network element includes one or more combination of the following ways.

If the start time of the multicast service is carried in the service information S2, the UE receives at least one of change notification of the SC-MCCH information and the SC-MCCH information SM-2 according to the start time to obtain the schedule information of the multicast service;

The UE starts to receive at least one of the update notification of the SC-MCCH and the SC-MCCH information SM-2 at specific time, the specific time is the next SC-MCCH modification period starting from or after next H-SFM mod m=0 after the time of receiving the SC-MCCH information SM-1, the m is length of the maximum eDRX period in the cell or equal to 1024; or, the UE receives the change notification of the SC-MCCH information or the SC-MCCH information SM-2 starting from the next SC-MCCH modification period after the time when the SC-MCCH information SM-1 is received;

If the schedule information of the multicast service is carried in the SC-MCCH information SM-1, then the UE receives the SC-MTCH of the multicast service from the SC-MTCH scheduling period of the first multicast service from or after the time of next H-SFN mod m=0, the m is length of the maximum eDRX period in the cell or equal to 1024; or, the UE starts to receive the SC-MTCH of the multicast service at start time of the next SC-MCCH period after time of receiving the SC-MCCH information SM-1.

If frequency information is indicated in the SC-MCCH information SM-1, the UE firstly performs cell reselection and performs reselection with the indicated frequency as the highest priority frequency.

In an embodiment, when the UE receives the service information of the multicast service the in the paging message, the receiving, by the UE according to the service information S2, the multicast service from the access network element includes one or more of the following ways.

If the start time of the multicast service is carried in the service information S2, the UE receives at least one of the change notification of the SC-MCCH information and the SC-MCCH information SM-2 according to the start time to obtain the schedule information of multicast service;

The UE starts to receive at least one of the update notification of the SC-MCCH and the SC-MCCH information SM-2 at specific time, the specific time is time of the next H-SFN mod m=0, the m is length of the maximum eDRX period in the cell or equal to 1024, that is, the change notification of the SC-MCCH information or the SC-MCCH information SM-2 starts to be received in SC-MCCH modification period from or after this time.

In this embodiment, the method further includes:

If the frequency information of the multicast service is carried in the service information of the multicast service, the UE performs cell reselection according to the frequency information.

The first method for notifying service information of multicast service described above will be described below using three exemplary embodiments.

The First Embodiment

An access network element sends update indication of multicast service information, and indicates service information of multicast service in a system information block (SIB).

A UE receives the update indication of multicast service information and the service information of multicast service, and receives multicast service according to the service information of multicast service.

In an embodiment, the sending, by the access network element, the update indication of multicast service information includes one or more of the following cases:

(1) One bit of indication information is sent in DCI of PDCCH for in paging or in paging message, the one bit of indication information represents whether there is update of the multicast service information.

In this case, a UE, that receives the above one bit of indication information (i.e., the update indication of the multicast service information) and saves the service information of any multicast service, is a target UE indicated by this update indication of the multicast service information.

(2) Service identification information of the service information is indicated in the DCI of PDCCH for paging or in the paging message. The service identification information is TMGI or information obtained by calculating or transforming the TMGI according to the first predetermined rule, which includes but is not limited to: low N bits in the TMGI, high N bits of the TMGI, or a result obtained by dividing all bits of the TMGI into N bits per group and performing an logical exclusive OR operation between groups.

In this case, if the UE receives the service identification information of the service information in the DCI of PDCCH for paging or in the paging message, it is considered that the update indication of the multicast service information is received; the UE, that receives the update indication of the multicast service information, compares the TMGI in the service information saved by the UE with the TMGI in the update indication of the multicast service information, if they matches (or they are the same), or if the result obtained by calculating or transforming the TMGI according to the first predetermined rule is the same as the service identification information, then the UE is a target UE indicated by the update indication of this multicast service information.

(3) Service area identification information of the service information is indicated in the DCI of PDCCH for paging or in the paging message. The service area identification information is service area identity SAI or information obtained by calculating or transforming the SAI according to the second predetermined rule, which includes but is not limited to: low N bits in the SAI, high N bits of the SAI, or a result obtained by dividing all bits of the SAI into N bits per group and performing an logical exclusive OR operation between groups.

In this case, if the UE receives the service area identification information of the service information in the DCI of PDCCH for paging or in the paging message, it is considered that the update indication of the multicast service information is received; the UE, that receives the update indication of the multicast service information, compares the SAI in the service information saved by the UE with the SAI in the update indication of the service information, if they matches (or they are the same), or if the result obtained by calculating or transforming the SAI according to the second predetermined rule is the same as the service area identification information, then the UE is a target UE indicated by the update indication of the multicast service information.

In an embodiment, the service information S2 of the multicast service indicated by the access network element in the system information block includes, but is not limited to: at least one of the TMGI and the SAI of the multicast service.

In an embodiment, if the service information S2 includes the TMGI, the service information S2 further includes at least one of start time and end time of the multicast service. If the service information S2 includes the SAI, the service information S2 further includes frequency information for sending the multicast service.

In an embodiment, the UE receives the service information of the multicast service according to one of the following ways, and the access network element sends the update indication of the multicast service information and the service information of the multicast service according to one of the following ways:

(1) The UE starts to receive the updated system information block at the time of the first H-SFN mod m=0 after time when the update indication of the multicast service information is received.

In this method, the access network element sends the update indication of the multicast service information in paging occasion within the previous maximum eDRX period, and starts to update the system information block in the next maximum eDRX period thereafter, the updated system information block includes service information S2 of the multicast service. Range of the maximum eDRX period is a time interval from H-SFN mod m=0 to H-SFN mod m=m−1, the m is length of the maximum eDRX period or equal to 1024.

(2) The UE immediately receives the system information block after receiving the update indication of the multicast service information.

In this method, the access network element sends the update indication of the multicast service information in paging occasion (PO) within a maximum eDRX period, and updates the system information block sent by system information before sending the update indication of the multicast service information, wherein the updated system information block includes service information S2 of the multicast service.

In an embodiment, the receiving, by the UE, the update indication of the multicast service information and the service information of the multicast service, and receiving the multicast service according to the service information of the multicast service include:

The target UE receives the system information block after receiving the update indication of the multicast service information to obtain service information S2, the service information S1 saved by the UE is compared with the obtained service information S2. If the service information S1 matches S2, the UE receives the multicast service according to the service information S2.

In this embodiment, the matching of the service information S1 and S2 may refer to: if the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, the receiving, by the UE, the multicast service according to the service information S2 includes one or more of the following ways.

(1) If start time of the multicast service is carried in the service information S2, the UE receives change notification of the SC-MCCH information or the SC-MCCH information according to the start time to obtain schedule information of the multicast service. The access network element indicates the schedule information of the multicast service in the SC-MCCH information.

(2) If start time of the multicast service is not carried in the service information S2, the UE starts to receive change notification of the SC-MCCH information or the SC-MCCH information from the next SC-MCCH repetition period after the time when the updated system information block is received, to obtain schedule information of the multicast service. The access network element indicates the schedule information of the multicast service in the SC-MCCH information.

(3) The UE starts to receives update notification of the SC-MCCH or the SC-MCCH information at specific time, the specific time is time of the next H-SFN mod m=0 after the time when the UE receives the updated system information block, the m is the length of maximum enhanced Discontinuous Reception (eDRX) period in the cell, that is, the change notification of the SC-MCCH information or the SC-MCCH information starts to be received in SC-MCCH modification period starting from this time or the first SC-MCCH modification period after this time, to obtain schedule information of the multicast service. The access network element indicates the schedule information of the multicast service in the SC-MCCH information.

In an embodiment, the method further includes that, if the frequency information of the multicast service is carried in the service information S2, the UE performs cell reselection according to the frequency information.

In this embodiment, the method further includes that, the access network element indicates the schedule information of the multicast service in the above SC-MCCH information, and the UE receives the SC-MTCH of the multicast service according to the schedule information of the multicast service.

In an embodiment, the method further includes that, the access network element updates the system information block includes the service information S2, before or after sending the update indication of the multicast service information. If the access network element updates the system information block before sending the update indication of the multicast service information, updating the system information block does not affect value tag of the system information.

In an embodiment, the DCI of the PDCCH for paging, and/or the paging message is sent in paging occasion within time range of the length of maximum eDRX period within the cell. The maximum eDRX period may include a complete maximum eDRX period, that is, from HSFN=0 to HSFN=m−1, or may span two continuous maximum eDRX periods.

That is, it is assumed that the length of the maximum eDRX period in the cell is m, the access network element is sent in paging occasion within time range of length m starting from H-SFN mod m=0, or sent in paging occasion within time range of length m starting from H-SFN mod m=x.

The Second Embodiment

An access network element sends update indication of multicast service information, and indicates the service information of the multicast service in the SC-MCCH information.

A UE receives the update indication of multicast service information and the service information, and receives the multicast service according to the service information.

In an embodiment, the sending, by the access network element, the update indication of multicast service information includes one or more of the following cases:

(1) One bit of indication information is sent in DCI of PDCCH for paging or in paging message, this one bit of indication information represents whether there is update of the multicast service information.

In this case, the UE, that receives the above one bit of indication information (i.e., the update indication of the multicast service information) and saves the service information locally, is a target UE indicated by this update indication of the multicast service information.

(2) Service identification information of the service information is indicated in the DCI of PDCCH for paging or in the paging message; the service identification information is TMGI or information obtained by calculating or transforming the TMGI according to the first predetermined rule, which includes but is not limited to: low N bits in the TMGI, high N bits of the TMGI, or result obtained by dividing all bits of the TMGI into N bits per group and performing an logical exclusive OR operation between groups.

In this case, if the UE receives the service identification information of the service information in the DCI of PDCCH for paging or in the paging message, it is considered that the update indication of the multicast service information is received; the UE, that receives the update indication of the multicast service information, compares the TMGI in the service information saved by the UE with the TMGI in the update indication of the multicast service information, if they matches (or they are the same), or if the result obtained by calculating or transforming the TMGI according to the first predetermined rule is the same as the service identification information, then the UE is a target UE for the update indication of the multicast service information.

(3) Service area identification information of the service information is indicated in DCI of PDCCH for paging or in the paging message; the service area identification information is SAI or information obtained by calculating or transforming the SAI according to the second predetermined rule, which includes but is not limited to: low N bits in the SAI, high N bits of the SAI, or result obtained by dividing all bits of the SAI into N bits per group and performing an logical exclusive OR operation between groups.

In this case, if the UE receives the service area identification information of the service information in the DCI of PDCCH for paging or in the paging message, it is considered that the update indication of the multicast service information is received; the UE, that receives the update indication of the multicast service information, compares the SAI in the service information saved by the UE with the SAI in the update indication of the multicast service information, if they matches (or they are the same), or if the result obtained by calculating or transforming the SAI according to the second predetermined rule is the same as the service area identification information, then the UE is a target UE indicated by the update indication of the multicast service information.

In an embodiment, the service information S2 of the multicast service indicated by the access network element in SC-MCCH information SM-1 includes: at least one of the TMGI and the SAI of the multicast service.

In an embodiment, if the service information S2 includes the TMGI, the service information S2 further includes at least one of start time and end time of the multicast service. If the service information S2 includes the SAI, the service information S2 further includes frequency information for sending the multicast service.

In an embodiment, the service information S2 further includes schedule information of the multicast service in the local cell, the schedule information includes one or more of the following: a scheduling period, an inactivity timer, an onduration timer, and frequency information of a carrier.

In an embodiment, the UE receives the service information of the multicast service according to one of the following ways, and the access network element sends the update indication of the multicast service information and the service information of the multicast service according to one of the following ways:

(1) The UE starts to receive the SC-MCCH information SM-1 at the time of the first H-SFN mod m=0 after the update indication of the multicast service information is received.

In this way, the access network element sends the update indication of the multicast service information in paging occasion within the previous maximum eDRX period, and starts to update the SC-MCCH information in the next maximum eDRX period thereafter, the updated SC-MCCH information SM-2 includes service information S2 of the multicast service. Range of the maximum eDRX period is a time interval from H-SFN mod m=0 to H-SFN mod m=m−1, the m is length of the maximum eDRX period or equal to 1024.

(2) The UE immediately receives the SC-MCCH information SM-1 after receiving the update indication of the multicast service information. In this way, the access network element sends the update indication of the multicast service information in paging occasion PO within a maximum eDRX period, and updates the SC-MCCH information SM-1 sent through SC-MCCH before sending the update indication of the multicast service information, the SC-MCCH information SM-1 includes service information S2 of the multicast service.

In an embodiment, the receiving, by the UE, the update indication of the multicast service information and the service information of the multicast service, and receiving the multicast service according to the service information of the multicast service include:

The target UE receives the SC-MCCH information SM-1 after receiving the update indication of the multicast service information to obtain service information S2, the service information S1 saved by the UE is compared with the obtained service information S2. If the service information S1 matches S2, the UE receives the multicast service according to the service information S2.

The SC-MCCH information SM-1 received by the target UE refer to the SC-MCCH information SM-1 to be received by the UE in SC-MCCH modification period starting from next H-SFN mod m=0. Here, the m is the length of maximum eDRX period in the cell, mod represents modulo operation.

In this embodiment, the matching of the service information S1 and S2 may refer to:

If the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, the receiving, by the UE, the multicast service according to the service information S2 includes one or more of the following ways.

(1) If start time of the multicast service is carried in the service information S2, the UE receives at least one of change notification of the SC-MCCH information SM-2 and the SC-MCCH information SM-2 according to the start time to obtain schedule information of the multicast service. The access network element indicates the schedule information of the multicast service in the SC-MCCH information SM-2.

The access network element updates the SC-MCCH information before the start time, and sends the SC-MCCH information SM-2.

(2) The UE starts to receives at least one of update notification of the SC-MCCH and the SC-MCCH information SM-2 at specific time, the specific time is the next SC-MCCH modification period starting from or after next H-SFM mod m=0 after the time of receiving the SC-MCCH information SM-1, the m is the length of maximum eDRX period in the cell or equal to 1024; or, the change notification of the SC-MCCH information or the SC-MCCH information SM-2 is received starting from next SC-MCCH modification period after the time of receiving the SC-MCCH information SM-1.

The access network element updates the SC-MCCH information at the above time, and sends the SC-MCCH information SM-2, the schedule information of the multicast service is carried in the SC-MCCH information SM-2.

(3) The schedule information of the multicast service is carried by the access network element in the SC-MCCH information SM-1, the UE receives SC-MTCH of the multicast service from the first SC-MTCH scheduling period of the multicast service starting from or after time of the next H-SFN mod m=0, the m is the length of maximum eDRX period in the cell or equal to 1024; or, the UE receives the SC-MTCH of the multicast service starting from the start time of next SC-MCCH period after time of receiving the SC-MCCH information SM-1.

(4) If frequency information is indicated in the SC-MCCH information SM-1 by the access network element, the UE firstly performs reselection with the indicated frequency as the highest priority frequency.

In an embodiment, the DCI of the PDCCH for paging, and/or the paging message is sent in paging occasion within a time range of length of the maximum eDRX period within the cell. The maximum eDRX period may be a complete maximum eDRX period, or may span two continuous maximum eDRX periods.

That is, it is assumed that the length of the maximum eDRX period in the cell is m, the sending is performed by the access network element in paging occasion within a time range of length m starting from H-SFN mod m=0, or performed in paging occasion within a time range of length m starting from H-SFN mod m=x.

The Third Embodiment

An access network element sends update indication of multicast service information, and indicates service information of multicast service in paging message.

A UE receives the update indication of multicast service information and the service information, and receives the multicast service according to the service information.

In an embodiment, the sending, by the access network element, the update indication of multicast service information includes one or more of the following cases:

(1) One bit of indication information is sent in DCI of PDCCH for paging.

In this case, the UE, that receives the update indication of multicast service information and saves the service information of any multicast service locally is a target UE indicated by this update indication of the multicast service information.

(2) Service identification information of the service information is indicated in the DCI of PDCCH for paging or in the paging message; the service identification information is TMGI or information obtained by calculating or transforming the TMGI according to the first predetermined rule, which includes but is not limited to: low N bits in the TMGI, high N bits of the TMGI, or a result obtained by dividing all bits of the TMGI into N bits per group and performing an logical exclusive OR operation between groups.

In this case, if the UE receives the service identification information of the service information in the DCI of PDCCH for paging or in the paging message, it is considered that the update indication of the multicast service information is received; the UE, that receives the update indication of the multicast service information, compares the TMGI in the service information saved by the UE with the TMGI in the update indication of the multicast service information, if they matches (or they are the same), or if the result obtained by calculating or transforming the TMGI according to the first predetermined rule is the same as the service identification information, then the UE is a target UE indicated by the update indication of the multicast service information.

(3) Service area identification information of the service information is indicated in the DCI of PDCCH for paging or in the paging message; the service area identification information is SAI or information obtained by calculating or transforming the SAI according to the second predetermined rule, which includes but is not limited to: low N bits in the SAI, high N bits of the SAI, or a result obtained by dividing all bits of the SAI into N bits per group and performing an logical exclusive OR operation between groups.

In this case, if the UE receives the service area identification information of the service information in the DCI of PDCCH for paging or in the paging message, it is considered that the update indication of the multicast service information is received; the UE, that receives the update indication of the multicast service information, compares the SAI in the service information saved by the UE with the SAI in the update indication of the multicast service information, if they matches (or they are the same), or if the result obtained by calculating or transforming the SAI according to the second predetermined rule is the same as the service area identification information, then the UE is a target UE indicated by the update indication of the multicast service information.

In an embodiment, the service information S2 indicated by the access network element in paging message includes: at least one of the TMGI and the SAI of the multicast service.

In an embodiment, if the service information S2 includes the TMGI, the service information S2 further includes at least one of start time and end time of the multicast service. If the service information S2 includes the SAI, the service information S2 further includes frequency information for sending the multicast service.

In an embodiment, the receiving, by the UE, the update indication of the multicast service information and the service information of the multicast service, and receiving the multicast service according to the service information of the multicast service include:

The target UE receives the paging message after receiving the update indication of the multicast service information to obtain service information S2, the service information S1 saved by the UE is compared with the obtained service information S2. If the service information S1 matches S2, the UE receives the multicast service according to the service information S2.

The matching of the service information S1 and S2 may refer to:

If the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, the receiving, by the UE, the multicast service according to the service information S2 includes one or more of the following ways.

(1) If start time of the multicast service is carried in the service information S2, the UE receives at least one of change notification of the SC-MCCH information and the SC-MCCH information to obtain schedule information of the multicast service according to the start time, i.e., starting from the start time or time prior to the start time. The access network element indicates the schedule information of the multicast service in the SC-MCCH information SM-2.

(2) The UE starts to receives at least one of update notification of the SC-MCCH and the SC-MCCH information SM-2 at specific time, the specific time is time of the next H-SFN mod m=0, the m is the length of maximum eDRX period in the cell or equal to 1024, that is, the change notification of the SC-MCCH or the SC-MCCH information SM-2 is to be received from the SC-MCCH modification period starting from or after this time.

The access network element updates the SC-MCCH information at the above time, and sends the SC-MCCH information SM-2, the schedule information of the multicast service is carried in the SC-MCCH information SM-2.

In an embodiment, the method further includes that, if frequency information of the service is carried in the service information S2, the UE performs cell reselection with the indicated frequency.

In an embodiment, the DCI of the PDCCH for paging, and/or the paging message is sent in paging occasion within a time range of length of the maximum eDRX period within the cell. The eDRX period may be a complete maximum eDRX period, or may span two continuous maximum eDRX periods.

That is, it is assumed that the length of the maximum eDRX period in the cell is m, the sending is performed by the access network element in paging occasion within a time range of length m starting from H-SFN mod m=0, or the sending is performed in paging occasion within a time range of length m starting from H-SFN mod m=x.

In an embodiment, the method further includes:

A core network element indicates the service information of the MBMS service to the access network element by signaling, and indicates the MBMS service to the access network element explicitly or implicitly, and indicates the service information of the MBMS service to the UE on the radio interface by using one of the methods provided in present embodiment.

Figure 5:
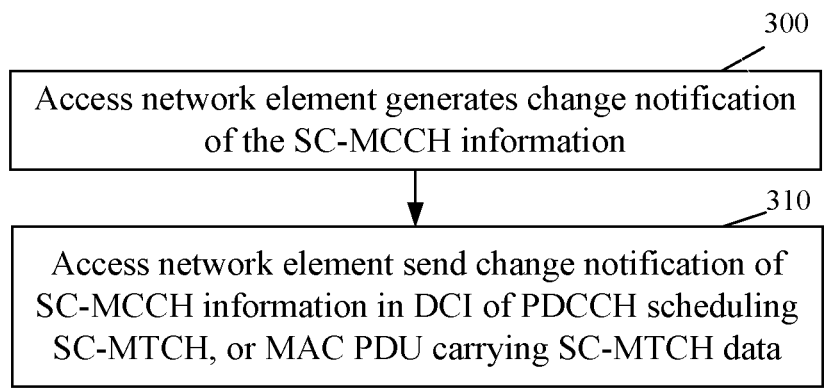
FIG. 5 is a flowchart illustrating a first method for notifying service information change of multicast service applied to an access network element side according to an embodiment of the present disclosure.

As shown in FIG. 5, the first method for notifying service information change of multicast service is applied to an access network element side, including step 310.

In step 310, the access network element send change notification of SC-MCCH information in DCI of PDCCH scheduling SC-MTCH, or MAC PDU carrying SC-MTCH data.

In an embodiment, prior to the step 310, the method further includes step 300.

In step 300, the access network element generates change notification of the SC-MCCH information.

In an embodiment, the content indicated by the access network element in the DCI of PDCCH scheduling the SC-MTCH, or the MAC PDU carrying the SC-MTCH data includes one or more combinations of the following content:

A one-bit indicator is used to indicate whether there is update of SC-MCCH information.

A one-bit indicator is used to indicate whether update of the SC-MCCH information is related to the SC-MTCH, or to indicate whether the SC-MCCH information has updated content related to the SC-MTCH.

A one-bit indicator is used to indicate whether there is updated content of the SC-MCCH information irrelevant to the SC-MTCH.

In an embodiment, the access network element sends the change notification of the SC-MCCH information in one or more of following cases.

When SC-MCCH information is changed, the access network element indicates, in the DCI of PDCCH scheduling the SC-MTCH, or the MAC PDU carrying the SC-MTCH data, whether the SC-MCCH information is changed.

When configuration information related to the SC-MTCH is changed in the SC-MCCH information, including: schedule information of the SC-MTCH, configuration information of MBMS service corresponding to the SC-MTCH, and neighboring area configuration information of the MBMS service related to the SC-MTCH; the access network element indicates, in the DCI of PDCCH scheduling the SC-MTCH, or the MAC PDU carrying the SC-MTCH data, whether content of the SC-MCCH information has change of content related to the SC-MTCH.

When the content of the SC-MCCH information irrelevant to the SC-MTCH is changed, the access network element indicates, in the DCI of PDCCH scheduling SC-MTCH, or the MAC PDU carrying the SC-MTCH data, that there is updated content of the SC-MCCH information irrelevant to the SC-MTCH.

In an embodiment, timing at which the access network element sends change notification of the SC-MCCH information includes one or more of:

A SC-MCCH modification period in which the SC-MCCH information is changed;

A SC-MCCH modification period prior to a SC-MCCH modification period in which the SC-MCCH information is changed.

In an embodiment, the sending, by the access network element in DCI of PDCCH scheduling SC-MTCH, change notification of the SC-MCCH information includes:

The access network element sends the DCI of PDCCH that does not indicate schedule information of the PDSCH carrying the SC-MTCH one or more times, but indicates the change notification of the SC-MCCH information in this DCI; the DCI of PDCCH is scrambled by using RNTI that schedules the SC-MTCH, and is scheduled for sending by using configuration of scheduling period of the SC-MTCH.

In an embodiment, the sending, by the access network element in MAC PDU carrying SC-MTCH data, change notification of the SC-MCCH information includes:

The access network element sends MAC PDU without carrying SC-MTCH data one or more times, but the change notification of the SC-MCCH information is indicated in the MAC PDU.

Figure 6:
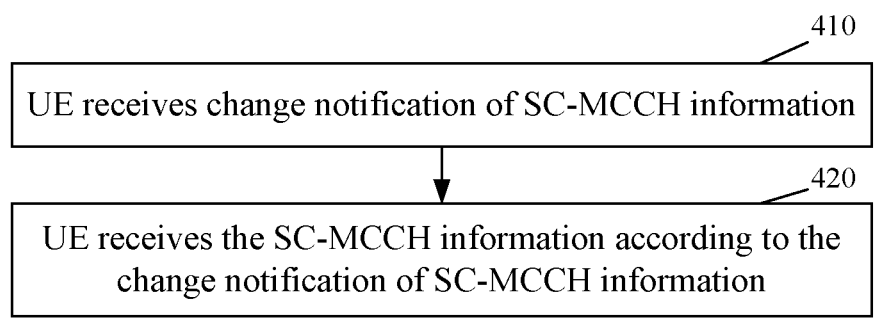
FIG. 6 is a flowchart illustrating a first method for notifying service information change of multicast service applied to a UE side according to an embodiment of the present disclosure.

As shown in FIG. 6, a first method for notifying service information change of multicast service is applied to a UE side according to an embodiment of the present disclosure, including steps 410-420.

In step 410, a UE receives change notification of SC-MCCH information.

In step 420, the UE receives the SC-MCCH information according to the change notification of SC-MCCH information.

In an embodiment, the receiving, by the UE, the SC-MCCH information according to the received change notification of SC-MCCH information includes:

The UE receives, in a carrier carrying SC-MCCH, the SC-MCCH information in a SC-MCCH modification period corresponding to time of receiving the change notification of the SC-MCCH information, or in a SC-MCCH modification period after time of receiving the change notification of the SC-MCCH information.

In an embodiment, the receiving, by the UE, the SC-MCCH information according to the received change notification of SC-MCCH information includes:

The UE receives, when the SC-MCCH and SC-MTCH are on different carriers, update information of the SC-MCCH in agreed SC-MCCH modification period after receiving the change notification of SC-MCCH information.

In an embodiment, the receiving, by the UE, the SC-MCCH information according to the received change notification of SC-MCCH information includes:

The UE receives, when SC-MCCH information scheduling conflicts with SC-MTCH scheduling resource that the UE receives currently in time-domain, the SC-MCCH information preferentially at least in the following cases:

When the change notification of SC-MCCH information indicates that change of content of the SC-MCCH information is related to the SC-MTCH, when MBMS service corresponding to the SC-MTCH is stopped, or when neighboring area information of the MBMS service corresponding to the SC-MTCH is changed.

The first method for notifying service information change of multicast service described above will be described below using an exemplary embodiment.

The Fourth Embodiment

An access network element sends change notification of SC-MCCH information in DCI of PDCCH scheduling SC-MTCH, or MAC PDU carrying SC-MTCH data. The SC-MTCH and the SC-MCCH are respectively scheduled for sending on the same carrier of the same frequency or different carriers of different frequencies.

The UE receives the SC-MCCH information according to the received change notification of the SC-MCCH information.

In an embodiment, the content indicated by the access network element in DCI of PDCCH scheduling the SC-MTCH, or the MAC PDU carrying the SC-MTCH data includes one or more combination of:

(1) A one-bit indicator to indicate whether there is update of SC-MCCH information.

(3) A one-bit indicator to indicate whether update of the SC-MCCH information is related to the SC-MTCH, or to indicate whether the SC-MCCH information has updated content related to the SC-MTCH.

(4) A one-bit indicator to indicate whether there is updated content of the SC-MCCH information irrelevant to the SC-MTCH.

In an embodiment, the change notification of the SC-MCCH information is sent by the access network element in one or more of the following cases.

(1) When SC-MCCH information is changed, the access network element indicates, in the DCI of PDCCH scheduling the SC-MTCH, or the MAC PDU carrying the SC-MTCH data, whether the SC-MCCH information is changed.

(2) When configuration information is related to the SC-MTCH is changed in the SC-MCCH information, which includes but is not limited to: schedule information of the SC-MTCH, configuration information of MBMS service corresponding to the SC-MTCH, and neighboring area configuration information of the MBMS service related to the SC-MTCH; the access network element indicates, in the DCI of PDCCH scheduling the SC-MTCH, or the MAC PDU carrying the SC-MTCH data, whether content of the SC-MCCH information has change of content related to the SC-MTCH.

(3) When the content of the SC-MCCH information irrelevant to the SC-MTCH is changed, the access network element indicates, in the DCI of PDCCH scheduling SC-MTCH, or the MAC PDU carrying the SC-MTCH data, that there is updated content of the SC-MCCH information irrelevant to the SC-MTCH.

In an embodiment, timing at which the access network element sends the change notification of the SC-MCCH information includes one or more of:

(1) A SC-MCCH modification period in which SC-MCCH information is changed; and (2) A SC-MCCH modification period prior to a SC-MCCH modification period in which the SC-MCCH information is changed. That is, the access network element sends the change notification of the SC-MCCH information by using the method in this embodiment in the previous SC-MCCH modification period, and sends updated SC-MCCH information after next SC-MCCH modification period.

In an embodiment, when sending the change notification of the SC-MCCH information, the access network element indicates the change notification of the SC-MCCH information in the DCI of PDCCH scheduling the SC-MTCH, or the MAC PDU carrying the SC-MTCH data within the time interval of the above SC-MCCH modification period.

In an embodiment, the receiving, by the UE, the SC-MCCH information according to the received change notification of the SC-MCCH information includes that, the UE receives SC-MCCH information in a carrier carrying the SC-MCCH within the SC-MCCH modification period corresponding to the time when the change notification of SC-MCCH information is received, or within the SC-MCCH modification period after the time when the change notification of SC-MCCH information is received.

In an embodiment, the sending, by the access network element, the change notification of the SC-MCCH information in DCI of PDCCH scheduling the SC-MTCH includes:

The access network element sends the DCI of PDCCH that does not indicate schedule information of the PDSCH carrying the SC-MTCH one or more times, but indicates the change notification of the SC-MCCH information in this DCI. The DCI of PDCCH is scrambled by using RNTI that schedules the SC-MTCH, and is scheduled for sending by using configuration of scheduling period of the SC-MTCH. This method could be applied to the case where there is no service data to be scheduled in one or more schedules of the SC-MTCH within the SC-MCCH modification period, but change of the SC-MCCH information is required to be indicated.

In an embodiment, the sending, by the access network element, the change notification of the SC-MCCH information in MAC PDU carrying SC-MTCH further includes:

The access network element sends MAC PDU without carrying SC-MTCH data one or more times, but the change notification of the SC-MCCH information is indicated in the MAC PDU.

In an embodiment, the receiving, by the UE, the SC-MCCH information according to the received change notification of the SC-MCCH information includes:

The UE receives, when the SC-MCCH and SC-MTCH are on different carriers, update information of the SC-MCCH in agreed SC-MCCH modification period after receiving the change notification of SC-MCCH information.

In an embodiment, the receiving, by the UE, the SC-MCCH information according to the received change notification of the SC-MCCH information includes:

The UE receives, when SC-MCCH information scheduling conflicts with SC-MTCH scheduling resource that the UE receives currently in time-domain, the SC-MCCH information preferentially at least in the following cases:

The change notification of SC-MCCH information indicates that change of content of the SC-MCCH information is related to the SC-MTCH, that is, when the schedule information of the SC-MTCH is included, when MBMS service corresponding to the SC-MTCH is stopped, or when neighboring area information of the MBMS service corresponding to the SC-MTCH is changed.

In an embodiment, the UE does not receive or attempt to receive the SC-MTCH data within time interval of the above-mentioned agreement of receiving updated SC-MCCH modification period of the SC-MCCH, the access network element does not schedule for sending the SC-MTCH data within time interval of the above-mentioned agreement of receiving update SC-MCCH modification period of the SC-MCCH.

In this embodiment, the indicating, by the MAC PDU carrying the SC-MTCH data, the update notification of the SC-MCCH means that one MAC control element (MAC CE) is carried in the MAC CE, the MAC CE is used to indicate the update notification of the SC-MCCH. And through a protocol, dedicated logical channel ID (LCID) of the MAC PDU is defined for the MAC PDU.

Figure 7:
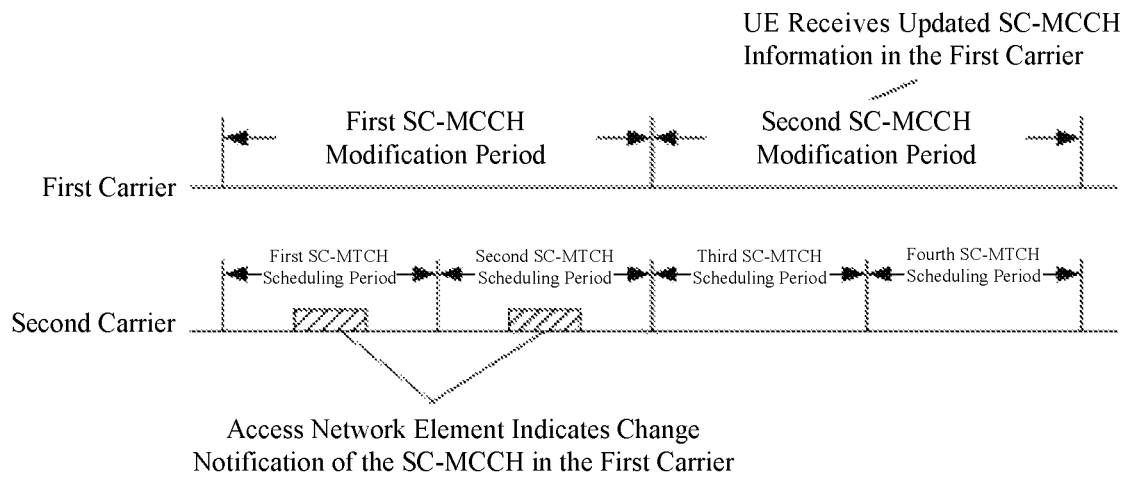
FIG. 7 is a schematic diagram illustrating the method described in the fourth embodiment.

FIG. 7 is an example implementation method in this embodiment, in FIG. 7, the SC-MTCH and the SC-MCCH are scheduled for sending in different first carrier and second carrier, respectively. In two SC-MTCH scheduling periods corresponding to the time interval of the first SC-MCCH modification period, the access network element indicates the change notification of the SC-MCCH information in the DCI of the PDCCH scheduling the SC-MTCH. The access network element starts to update the SC-MCCH information in the second SC-MCCH modification period of the first carrier. At this time, the UE receives the updated SC-MCCH information in the second SC-MCCH modification period, the access network element does not schedule for sending the SC-MTCH data within time interval of the second SC-MCCH modification period.

According to the method of the present embodiment, when scheduling the change notification of the SC-MCCH information, the access network element is not required to stagger the scheduling of all SC-MTCHs on different carriers in the time domain. A UE, that could not receive a plurality of carriers simultaneously, could also receive change notification of the SC-MCCH information on the carrier on which the SC-MTCH is received, so that the change of the SC-MCCH information is not missed.

Figure 8:
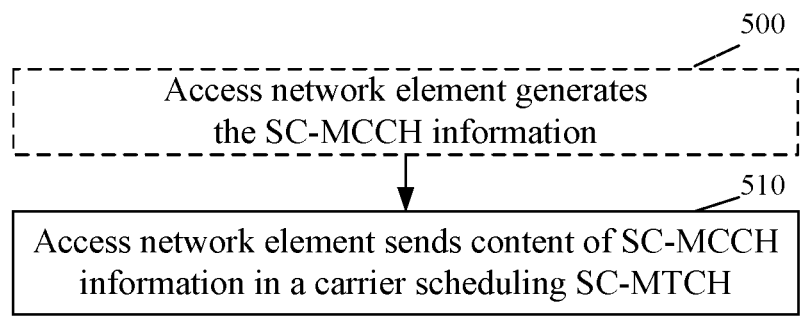
FIG. 8 is a flowchart illustrating a second method for notifying service information change of multicast service applied to an access network element side according to an embodiment of the present disclosure.

As shown in FIG. 8, the second method for notifying service information change of multicast service is applied to an access network element side according to an embodiment of the present disclosure, including step 510.

In step 510, an access network element sends content of SC-MCCH information in a carrier scheduling SC-MTCH, and the SC-MCCH and the SC-MTCH are respectively carried and scheduled for sending on different carriers.

In an embodiment, prior to the step 510, the method further includes step 500.

In step 500, the access network element generates the SC-MCCH information.

In an embodiment, the content of the SC-MCCH information sent by the access network element in the carrier scheduling the SC-MTCH includes one or more of the following cases:

The content of SC-MCCH information is the same as content of the SC-MCCH information carried by the SC-MCCH sent in the cell, and includes at least schedule information of all services that are currently sent in the cell;

The content of the SC-MCCH information related to the SC-MTCH includes one or more of: schedule information related to the SC-MTCH, identification information of MBMS service corresponding to this SC-MTCH, and neighboring area configuration information related to the MBMS service.

In an embodiment, the content of the SC-MCCH information sent by the access network element includes at least one of the following ways:

In the first way: the access network element sends DCI of physical downlink control channel PDCCH in scheduling period of the SC-MTCH, and the DCI of the PDCCH is scrambled by using dedicated RNTI, the DCI scrambled by the dedicated RNTI indicates schedule information of physical downlink shared channel PDSCH carrying message M;

In the second way: the access network element sends DCI of PDCCH in the scheduling period for scheduling the SC-MTCH, and the DCI of the PDCCH is scrambled by using a RNTI that schedules the SC-MTCH; the access network element indicates that the content carried by the scheduled PDSCH is message M in the DCI;

In the third way: the access network element sends the content of the SC-MCCH information by using a medium access control MAC layer control element CE; the content of the SC-MCCH information is encapsulated in the MAC CE, and the MAC CE is in a MAC protocol data unit PDU carrying the SC-MTCH data;

In the fourth way: message M, including the content of the SC-MCCH information, is carried in logical channel SC-MCCH by the access network element, and SC-MCCH carrying the message M and SC-MTCH carrying service data multiplex MAC PDU by MAC layer multiplexing;

In the first way and the second way, the message M includes the content of the SC-MCCH information; the message M is carried by the logical channel SC-MCCH.

In an embodiment, in the first way and the second way, the number of repeated sending of the DCI of the PDCCH is indicated by a system information block and the SC-MCCH information; the number of repetition of the PDSCH carrying the message M is indicated by the system information block, the SC-MCCH information, or the DCI of the PDCCH.

Figure 9:
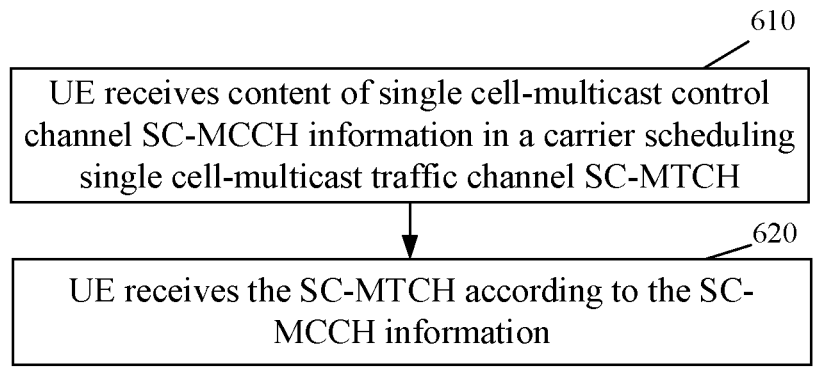
FIG. 9 is a flowchart illustrating a second method for notifying service information change of multicast service applied to a UE side according to an embodiment of the present disclosure.

As shown in FIG. 9, the second method for notifying service information change of multicast service is applied to a UE side according to an embodiment of the present disclosure, including step 610.

In step 610, a UE receives content of single cell-multicast control channel SC-MCCH information in a carrier scheduling single cell-multicast traffic channel SC-MTCH.

In an embodiment, after the step 610, the method further includes step 620.

In step 620, the UE receives the SC-MTCH according to the SC-MCCH information.

In an embodiment, the receiving, by the UE in a carrier scheduling SC-MTCH, content of SC-MCCH information includes at least one of the following ways:

When the UE detects the DCI of PDCCH scrambled by dedicated RNTI in scheduling period of SC-MTCH, it determines that the content carried by PDSCH scheduled by the DCI is message M, the scheduling of the message M is treated as performing process of inactivity timer of the message M in a same way as one scheduling of SC-MTCH data, the message M includes part or all of the content of SC-MCCH information;

When the UE detects that this scheduling content indicated by the DCI of PDCCH scheduling the SC-MTCH is message M in the scheduling period of SC-MTCH, it is determined that this scheduling content is the message M, the scheduling of the message M is treated as performing the process of inactivity timer of the message M in a same way as one scheduling of the SC-MTCH data;

The UE receives the content of SC-MCCH information by receiving a medium access control MAC protocol data unit PDU of the SC-MTCH data;

After receiving the updated content of SC-MCCH information, the UE applies the content of the received updated SC-MCCH information after the time boundary of the next SC-MCCH modification period.

The second method for notifying service information change of multicast service described above will be described below using an exemplary embodiment.

The Fifth Embodiment

An access network element sends content of SC-MCCH information in a carrier scheduling SC-MTCH, and the SC-MCCH and the SC-MTCH are respectively carried and scheduled for sending on different carriers.

The content of the SC-MCCH information sent by the access network element in the carrier scheduling the SC-MTCH includes one or more of the following cases:

(1) The complete content of the SC-MCCH information, that is, the content of SC-MCCH information is the same as content of the SC-MCCH information carried by the SC-MCCH sent in the cell, and includes at least schedule information of all services that are currently sent in the cell.

(2) Part of the content of the SC-MCCH information: the content of the SC-MCCH information related to the SC-MTCH includes one or more of: schedule information related to the SC-MTCH, identification information of MBMS service corresponding to this SC-MTCH, and neighboring area configuration information related to the MBMS service.

In an embodiment, the content of the SC-MCCH information sent by the access network element includes at least one of the following ways:

In the first sending way:

The access network element sends DCI of PDCCH in scheduling period of the SC-MTCH, and the DCI of the PDCCH is scrambled by using a dedicated RNTI, that is, the dedicated RNTI is different from RNTI used for scheduling the SC-MTCH. The DCI scrambled by the dedicated RNTI indicates schedule information of physical downlink shared channel (PDSCH) carrying message M.

The message M includes the content of the SC-MCCH information. The message M is carried by the logical channel SC-MCCH.

When the first sending way is used, and when the UE detects the DCI of the PDCCH scrambled by the dedicated RNTI in the scheduling period of the SC-MTCH, it could be known that the content carried by the PDSCH scheduled by the DCI is the message M.

After receiving the message M scheduled by the above dedicated RNTI, the UE performs process of inactivity timer in the same way as the downlink scheduling of the SC-MTCH, that is, the UE treats this scheduling of the message M as performing process of inactivity timer of the message M in the same way as one scheduling of SC-MTCH data, the message M includes part or all of the content of SC-MCCH information.

The number of repeated sending of PDCCH signaling (including but not limited to DCI) in the way is indicated by a system information block and SC-MCCH information.

The number of repetitions of the PDSCH carrying the message M in the way is indicated by a system information block, SC-MCCH information, or DCI of the PDCCH in the way.

The second sending way:

The access network element sends DCI of PDCCH in the scheduling period for scheduling the SC-MTCH, and the DCI of the PDCCH is scrambled by using a RNTI that schedules the SC-MTCH. The access network element indicates that the content carried by this scheduled PDSCH is message M in the DCI.

The message M includes the content of the SC-MCCH information, and the message M is carried by the logical channel SC-MCCH.

The indicating that the content carried by this scheduled PDSCH is message M is indicated by one bit of information in the DCI, if this one bit of information does not indicate that the content carried by this scheduled PDSCH is message M, it represents that the content carried by this scheduled PDSCH is SC-MTCH data.

When the second sending way is used, and when the UE detects that this scheduled content, indicated by above-mentioned DCI of PDCCH scheduling the SC-MTCH, is the message M in the scheduling period of the SC-MTCH, it could be known that this scheduled content is the message M.

After receiving above-mentioned message M, the UE performs process of inactivity timer in the same way as the downlink scheduling of the SC-MTCH, that is, the UE treats this scheduling of the message M as performing process of inactivity timer of the message M in the same way as one scheduling of SC-MTCH data.

The number of repeated sending of PDCCH signaling in the way is indicated by a system information block and SC-MCCH information.

The number of repetitions of carrying the PDSCH in the way is indicated by a system information block, SC-MCCH information, or DCI of the PDCCH in the way.

The third sending way:

The access network element sends the content of the SC-MCCH information through a Media Access Control (MAC) layer Control Element (CE).

The content of the SC-MCCH information is encapsulated in the MAC CE, and the MAC CE is in a MAC protocol data unit (PDU) carrying the SC-MTCH data.

That is, MAC CE, that includes above-mentioned content of the SC-MCCH information, is further carried, by the access network element, in MAC PDU which sends the carried SC-MTCH data.

When the third sending way is used, the UE receives the content of the SC-MCCH information by receiving the MAC PDU of the SC-MTCH data. The method for defining format of the MAC CE uses a related protocol.

That is, dedicated logical channel identify (LCID) is defined for the MAC CE, and the UE identifies the MAC CE as the MAC CE including the content of the SC-MCCH information by using the dedicated LCID. Length of the MAC CE is variable to accommodate different content sizes of SC-MCCH information.

The content of the SC-MCCH information is included in the MAC CE in the form of ASN.1 code, or displayed cell definition. If the content of the SC-MCCH information is included in the MAC CE in the form of the ASN.1 code, then ASN.1 coded code stream of the content of the SC-MCCH information is arranged in the MAC CE in order of bytes.

The fourth sending way:

The message M, including the content of the SC-MCCH information, is carried in logical channel SC-MCCH by the access network element, and carried on downlink shared channel (DL-SCH) multiplexing with the SC-MTCH, and finally carried on the PDSCH.

That is, in this way, SC-MCCH carrying the message M and SC-MTCH carrying service data multiplex MAC PDU by MAC layer multiplexing.

The LCIDs thereof are respectively defined for the SC-MCCH and the SC-MTCH.

In the method of present embodiment, the access network element may send the content of the SC-MCCH information multiple times in the time interval of the same SC-MCCH modification period by using the method provided in this embodiment. During the same SC-MCCH modification period, the content of multiple SC-MCCH information sent by the access network element remains unchanged.

In the foregoing method provided in this embodiment, after receiving the updated content of SC-MCCH information, the UE applies the content of the received updated SC-MCCH information after the time boundary of the next SC-MCCH modification period, for example, the SC-MTCH data is received in accordance with the received content of SC-MCCH information.

With the method of the embodiment, the access network element simultaneously sends the content of the SC-MCCH information in the carrier scheduling the SC-MTCH. Therefore, a problem, that the UE is required to go back to the SC-MCCH carrier when receiving change of SC-MCCH information, is avoided. The capability requirements for the UE to simultaneously receive the SC-MCCH and the SC-MTCH are also avoided. Thereby, when the access network element separately schedules the SC-MTCH and the SC-MCCH on different carriers, the schedule of the SC-MCCH and the SC-MTCH may not be required to be considered to be staggered (without conflicting) in the time domain resources, and the flexibility of schedule of access network element is improved.

Figure 10:
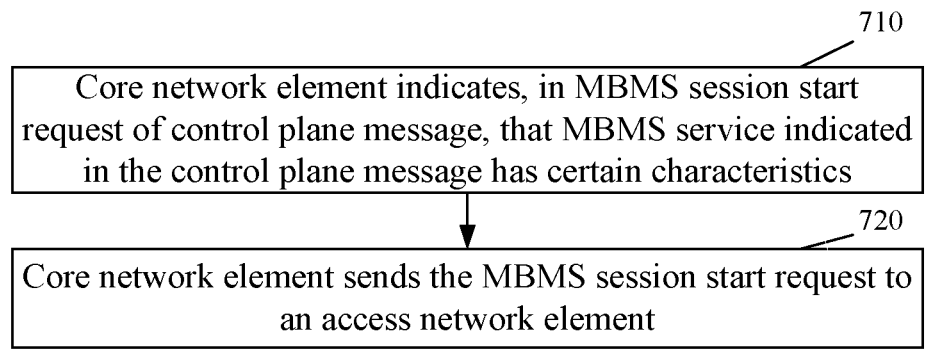
FIG. 10 is a flowchart illustrating a second method for notifying service information of multicast service applied to a core network element side according to an embodiment of the present disclosure.

As shown in FIG. 10, the second method for notifying service information of multicast service is applied to a core network element side according to an embodiment of the present disclosure, including steps 710-720.

In step 710, the core network element indicates, in MBMS session start request of control plane message, that MBMS service indicated in the control plane message has at least one of the following characteristics:

(1) The MBMS service is a push type.

(2) Updated notification of MBMS service information is required to be completed by a paging mechanism.

(3) The MBMS service is an abrupt type.

In step 720, the core network element sends the MBMS session start request to an access network element.

In an embodiment, the core network element further indicates parameter of the MBMS service in the MBMS session start request; the parameter includes but is not limited to one or more of: start time, SAI, and frequency information.

In an embodiment, the MBMS session start request is used to indicate that the access network element is processed according to the following way.

By scheduling the downlink control information DCI of the paging message or the paging message, in paging occasion within range of a hyper-system frame number H-SFN mod m=0 to H-SFN mod m=m−1, the user equipment UE is indicated to receive SC-MCCH information starting at time of the next H-SFN mod m=0 after time of receiving this DCI or the paging message; schedule information of the multicast service is indicated in the SC-MCCH information; the m is the maximum value of the eDRX period in the cell, or equal to 1024.

In this embodiment, after receiving the MBMS session start request, the access network element performs the foregoing processing.

The second method for notifying service information of multicast service described above is described below with an exemplary embodiment.

The Sixth Embodiment

A core network element, in sent MBMS session start request of control plane message, indicates that the MBMS service indicated by the message has one of the following characteristics:

(1) The MBMS service is a push type.

(2) Updated notification of MBMS service information is required to be completed by a paging mechanism.

(3) The MBMS service is an abrupt type.

That is, the core network element indicates that the MBMS service is required to complete updated notification of service information of the MBMS service by using a paging mechanism to an access network element.

In an embodiment, the core network element further indicates one or more of start time, SAI, frequency information and the like of the MBMS service in the MBMS session start request;

After receiving the foregoing MBMS Session Start Request message, the access network element performs the updated notification of the multicast service information according to the foregoing method of the embodiment 1, 2, or 3, that is, the updated indication of the multicast service information is sent, and service information of the multicast service is indicated.

Or, the access network element is processed as follows:

By scheduling the DCI of the paging message, that is, the DCI scrambled by the RNTI for paging, or the paging message, the access network element indicates, within the range of the maximum period of one eDRX, that is, paging occasion within range of H-SFN mod m=0 to H-SFN mod m=m−1, the UE to receive SC-MCCH information starting at time of the next H-SFN mod m=0 after time of receiving this DCI or the paging message. The access network element indicates schedule information of the multicast service in the SC-MCCH information. The m is the maximum value of the eDRX period in the cell, or equal to 1024.

After receiving the schedule information of the multicast service, the UE determines whether the multicast service is multicast service that is of interest to the UE. For example, the locally stored multicast service identity TMGI is compared with the received multicast service identity TMGI indicated by schedule information of the multicast service, if they are the same, then the UE considers that the multicast service interests the UE, and the multicast service is received according to the schedule information of the MBMS service.

Figure 11:
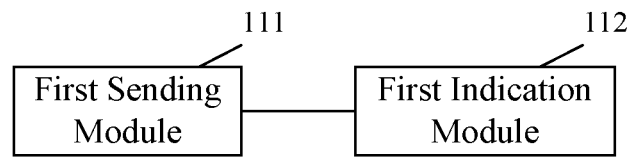
FIG. 11 is a schematic diagram illustrating a first apparatus for notifying service information of multicast service set in an access network element according to an embodiment of the present disclosure.

As shown in FIG. 11, a first apparatus for notifying service information of multicast service set in an access network element is provided by the embodiment of the present disclosure, including a first sending module 111 and a first indication module 112.

The first sending module 111 is configured to send update indication of multicast service information to a user equipment UE.

The first indication module 112 is configured to indicate service information of multicast service to the UE.

In an embodiment, the indicating, by the first indication module, the service information of multicast service to the UE includes at least one of the following way:

The first indication module indicates the service information of multicast service in a system information block;

The first indication module indicates the service information of multicast service in single cell-multicast control channel SC-MCCH information.

The first indication module indicates the service information of multicast service in paging message.

In an embodiment, the sending, by the first sending module, the update indication of multicast service information to the UE includes one or more of the following cases:

One bit of information is sent in downlink control information DCI of the physical downlink control channel PDCCH for paging or in paging message.

Service identification information of the service information is indicated in the DCI of PDCCH for paging or in the paging message; the service identification information is temporary multicast group identity TMGI, or information obtained by calculating or transforming the TMGI according to a first predetermined rule, which includes low N bits in the TMGI, high N bits of the TMGI, or a result obtained by, dividing bits of the TMGI into N bits per group and performing an logical exclusive OR operation between groups;

Service area identification information of the service information is indicated in the DCI of PDCCH for paging or in the paging message; the service area identification information is service area identity SAI or information obtained by calculating or transforming the SAI according to a second predetermined rule, which includes: low N bits in the SAI, high N bits of the SAI, or a result obtained by dividing all bits of the SAI into N bits per group and performing an logical exclusive OR operation between groups;

In an embodiment, the service information of the multicast service indicated by the first indication module includes: at least one of the TMGI and the SAI of the multicast service.

In an embodiment, if the service information includes the TMGI, the service information further includes at least one of start time and end time of the multicast service. If the service information includes the SAI, the service information further includes frequency information of the multicast service.

In an embodiment, the first indication module is further configured to indicate schedule information of the multicast service to the UE in the SC-MCCH information.

In an embodiment, the apparatus further includes:

An update module is configured to update, before or after sending the update indication of the multicast service information to the UE, the system information block including the service information of the multicast service.

In an embodiment, the apparatus further includes:

A request receiving module is configured to receive MBMS Session Start Request of control plane message sent by a core network element before the first sending module sends the update indication of multicast service information; the control plane message is used to instruct the access network element that the multimedia broadcast multicast MBMS service indicated by the message is required to complete the update notification of service information through the paging mechanism.

In an embodiment, when the first sending module indicate the service information of the multicast service in the system information block, the first sending module and the first indication module send the update indication of the multicast service information to the UE and indicate the service information of the multicast service to the UE according to one of the following way.

The first sending module sends the update indication of the multicast service information in paging occasion (PO) within the previous maximum enhanced discontinuous reception eDRX period, the first indication module starts to update the system information block in the next maximum eDRX period thereafter, the updated system information block includes service information S2 of the multicast service; range of the maximum eDRX period is a time interval from a hyper-system frame number H-SFN mod m=0 to H-SFN mod m=m−1, the m is length of the maximum eDRX period or equal to 1024.

The first sending module sends the update indication of the multicast service information in paging occasion within a maximum eDRX period, and the first indication module updates the system information block sent by system information before sending the update indication of the multicast service information, wherein the updated system information block includes service information S2 of the multicast service.

In an embodiment, when the first indication module indicates the service information of the multicast service in the single cell multicast control channel SC-MCCH information, the first sending module and the first indication module send the update indication of the multicast service information to the UE and indicate the service information of the multicast service to the UE according to one of the following way.

The first sending module sends the update indication of the multicast service information in paging occasion within the previous maximum eDRX period, and the first indication module starts to update the SC-MCCH information in the next maximum eDRX period thereafter, the updated SC-MCCH information SM-2 includes service information S2 of the multicast service; range of the maximum eDRX period is a time interval from a H-SFN mod m=0 to H-SFN mod m=m−1, m is length of the maximum eDRX period or equal to 1024.

The first sending module sends the update indication of the multicast service information in paging occasion within one maximum eDRX period, and the first indication module updates SC-MCCH information SM-1 sent through the SC-MCCH before sending the update indication of the multicast service information, wherein the SC-MCCH information SM-1 includes service information S2 of the multicast service.

Figure 12:
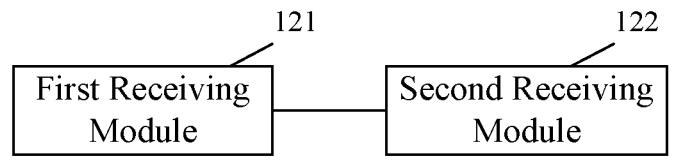
FIG. 12 is a schematic diagram illustrating a first apparatus for notifying service information of multicast service set in a UE according to an embodiment of the present disclosure.

As shown in FIG. 12, a first apparatus for notifying service information of multicast service provided by an embodiment of the present disclosure is set in a user equipment side, including a first receiving module 121 and a second receiving module 122.

The first receiving module 121 is configured to receive update indication of multicast service information and service information of multicast service from an access network element.

The seconding module 122 is configured to receive the multicast service from the access network element based on the service information of the multicast service.

In an embodiment, the receiving, by the first receiving module, service information of multicast service from the access network element includes, but is not limited to, at least one of the following ways:

The first receiving module receives the service information of the multicast service in the system information block.

The first receiving module receives the service information of the multicast service in single cell-multicast control channel SC-MCCH information.

The first receiving module receives the service information of the multicast service in the paging message.

In an embodiment, the receiving, by the receiving module, the update indication of multicast service information from the access network element includes at least one or more of the following cases.

The receiving module receives one bit of information in downlink control information DCI of the physical downlink control channel PDCCH for paging or in paging message; if a UE, where the first receiving module locates, saves the service information of any multicast service, this UE, where the first receiving module locates, is a target UE indicated by the update indication of the multicast service information;

Service identification information of the service information is received by the first receiving module in the DCI of PDCCH for paging or in the paging message; the service identification information is temporary multicast group identity TMGI or information obtained by calculating or transforming the TMGI according to the first predetermined rule, which includes but is not limited to: low N bits in the TMGI, high N bits of the TMGI, or a result obtained by dividing all bits of the TMGI into N bits per group and performing an logical exclusive OR operation between groups; If the TMGI in the service information saved by the UE where the first receiving module locates matches the TMGI in the service identification information, or if the result obtained by calculating or transforming the TMGI saved by the UE according to the first predetermined rule is the same as the service identification information, then the UE, where the first receiving module locates, is a target UE indicated by the update indication of the multicast service information;

Service area identification information of the service information is received by the first receiving module in the DCI of PDCCH for paging or in the paging message; the service area identification information is service area identity SAI or information obtained by calculating or transforming the SAI according to the second predetermined rule, which includes: low N bits in the SAI, high N bits of the SAI, or result obtained by dividing all bits of the SAI into N bits per group and performing an logical exclusive OR operation between groups; If the SAI in the service information saved by the UE matches the SAI in the service identification information, or if the result obtained by calculating or transforming the SAI saved by the UE where the first receiving module locates according to the second predetermined rule is the same as the service identification information, then the UE, where the first receiving module locates, is a target UE indicated by the update indication of the multicast service information;

In an embodiment, the receiving, by the second receiving module according to the service information of the multicast service, the multicast service from the access network element includes:

When the UE is the target UE, the service information S1 saved by the UE is compared with the obtained service information S2. If the service information S1 matches S2, the second receiving module receives the multicast service according to the service information S2.

The matching of the service information S1 and S2 may refer to:

If the TMGI is carried in the service information S2, the TMGIs of the service information S1 and S2 are the same; or, if the SAI is carried in the service information S2 without carrying the TMGI, the SAIs of the service information S1 and S2 are the same.

In an embodiment, when the second receiving module receives the service information of the multicast service in the system information block, the second receiving module receives the service information of the multicast service from the access network element according to one of the following ways.

The second receiving module receives updated system information block at the time of the first hyper-system frame number H-SFN mod m=0 after the update indication of the multicast service information is received by the first receiving module; m is length of the maximum enhanced discontinuous reception eDRX period or equal to 1024.

The second receiving module immediately receives the system information block after the first receiving module receives the update indication of the multicast service information.

In an embodiment, when the second receiving module receives the service information of the multicast service in the SC-MCCH information, the second receiving module receives the service information of the multicast service from the access network element according to one of the following ways:

The second receiving module receives SC-MCCH information SM-1 at the time of the first H-SFN mod m=0 after the update indication of the multicast service information is received by the first receiving module; m is length of the maximum eDRX period or equal to 1024.

The second receiving module immediately receives the SC-MCCH information SM-1 after the first receiving module receives the update indication of the multicast service information.

In an embodiment, when the first receiving module receives the service information of the multicast service in the system information block, the receiving, by the second receiving module according to the service information S2, the multicast service from the access network element includes one or more of the following ways.

If start time of the multicast service is carried in the service information S2, the second receiving module receives change notification of the SC-MCCH information or the SC-MCCH information according to the start time to obtain schedule information of the multicast service.

If start time of the multicast service is not carried in the service information S2, the second receiving module starts to receive change notification of the SC-MCCH information or the SC-MCCH information from the next SC-MCCH repetition period after the time when the updated system information block is received, to obtain schedule information of the multicast service.

The second receiving module starts to receives update notification of the SC-MCCH or the SC-MCCH information at specific time to obtain schedule information of the multicast service, the specific time is time of the next hyper-system subframe number H-SFN mod m=0 after the time when the UE receives the updated system information block, the m is the length of maximum enhanced discontinuous reception eDRX period in the cell.

In an embodiment, when the first receiving module receives the service information of the multicast service in the SC-MCCH information, the receiving, by the second receiving module according to the service information S2, the multicast service from the access network element includes one or more combination of the following ways.

If the start time of the multicast service is carried in the service information S2, the second receiving module receives at least one of change notification of the SC-MCCH information and the SC-MCCH information SM-2 according to the start time to obtain the schedule information of the multicast service;

The second receiving module starts to receive at least one of the update notification of the SC-MCCH and the SC-MCCH information SM-2 at specific time, the specific time is the next SC-MCCH modification period starting from or after next H-SFM mod m=0 after the time of receiving the SC-MCCH information SM-1, the m is length of the maximum eDRX period in the cell or equal to 1024; or, the UE receives the change notification of the SC-MCCH information or the SC-MCCH information SM-2 starting from the next SC-MCCH modification period after the SC-MCCH information SM-1 is received;

If the schedule information of the multicast service is carried in the SC-MCCH information SM-1, then the second receiving module receives the SC-MTCH of the multicast service from the SC-MTCH scheduling period of the first multicast service from or after the time of next H-SFN mod m=0, the m is length of the maximum eDRX period in the cell or equal to 1024; or, the second receiving module starts to receive the SC-MTCH of the multicast service at start time of the next SC-MCCH period after time of receiving the SC-MCCH information SM-1.

If frequency information is indicated in the SC-MCCH information SM-1, the second receiving module firstly performs cell reselection and performs reselection with the indicated frequency as the highest priority frequency.

In an embodiment, when the first receiving module receives the service information of the multicast service the in the paging message, the receiving, by the second receiving module according to the service information S2, the multicast service from the access network element includes one or more of the following ways.

If the start time of the multicast service is carried in the service information S2, the second receiving module receives at least one of the change notification of SC-MCCH information and the SC-MCCH information SM-2 according to the start time to obtain the schedule information of multicast service;

The second receiving module starts to receive at least one of the update notification of the SC-MCCH and the SC-MCCH information SM-2 at specific time, the specific time is time of the next H-SFN mod m=0, the m is length of the maximum eDRX period in the cell or equal to 1024, that is, the change notification of the SC-MCCH information or the SC-MCCH information SM-2 starts to be received in SC-MCCH modification period from or after this time.

In an embodiment, the method for notifying the service information further includes:

If the frequency information of the multicast service is carried in the service information of the multicast service, the second receiving module performs cell reselection according to the frequency information.

Figure 13:
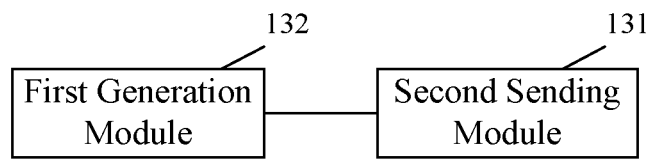
FIG. 13 is a schematic diagram illustrating a first apparatus for notifying service information change of multicast service set in an access network element according to an embodiment of the present disclosure.

As shown in FIG. 13, the first apparatus for notifying the service information change of multicast service provided by the embodiments of present disclosure is set in an access network element, including a second sending module 131.

The second sending module 131 is configured to send change notification of single cell-multicast control channel SC-MCCH information in downlink control information DCI of physical downlink control channel PDCCH scheduling single cell-multicast traffic channel SC-MTCH, or medium access control MAC protocol data unit PDU carrying SC-MTCH data.

In an embodiment, the apparatus further includes a first generation module 132.

The first generation module 132 is configured to generate the change notification of the SC-MCCH information.

In an embodiment, the content indicated by the second sending module in the DCI of PDCCH scheduling the SC-MTCH, or the MAC PDU carrying the SC-MTCH data includes one or more combinations of the following content:

A one-bit indicator is used to indicate whether there is update of SC-MCCH information.

A one-bit indicator is used to indicate whether update of the SC-MCCH information is related to the SC-MTCH, or to indicate whether the SC-MCCH information has updated content related to the SC-MTCH.

A one-bit indicator is used to indicate whether there is updated content of the SC-MCCH information irrelevant to the SC-MTCH.

In an embodiment, the second sending module sends the change notification of the SC-MCCH information in one or more of following cases.

When SC-MCCH information is changed, the second sending module indicates, in the DCI of PDCCH scheduling the SC-MTCH, or the MAC PDU carrying the SC-MTCH data, whether the SC-MCCH information is changed.

When configuration information related to the SC-MTCH is changed in the SC-MCCH information, including: schedule information of the SC-MTCH, configuration information of MBMS service corresponding to the SC-MTCH, and neighboring area configuration information of the MBMS service related to the SC-MTCH; the second sending module indicates, in the DCI of PDCCH scheduling the SC-MTCH, or the MAC PDU carrying the SC-MTCH data, whether content of the SC-MCCH information has change of content related to the SC-MTCH.

When the content of the SC-MCCH information irrelevant to the SC-MTCH is changed, the second sending module indicates, in the DCI of PDCCH scheduling SC-MTCH, or the MAC PDU carrying the SC-MTCH data, that there is updated content of the SC-MCCH information irrelevant to the SC-MTCH.

In an embodiment, timing at which the second sending module sends change notification of the SC-MCCH information includes one or more of:

A SC-MCCH modification period in which the SC-MCCH information is changed;

A SC-MCCH modification period prior to a SC-MCCH modification period in which the SC-MCCH information is changed.

In an embodiment, the sending, by the second sending module in DCI of PDCCH scheduling SC-MTCH, change notification of the SC-MCCH information includes:

The second sending module sends the DCI of PDCCH that does not indicate schedule information of the PDSCH carrying the SC-MTCH one or more times, but indicates the change notification of the SC-MCCH information in this DCI; the DCI of PDCCH is scrambled by using RNTI that schedules the SC-MTCH, and is scheduled for sending by using configuration of scheduling period of the SC-MTCH.

In an embodiment, the sending, by the second sending module in MAC PDU carrying SC-MTCH data, change notification of the SC-MCCH information includes:

The second sending module sends MAC PDU without carrying SC-MTCH data one or more times, but the change notification of the SC-MCCH information is indicated in the MAC PDU.

Figure 14:
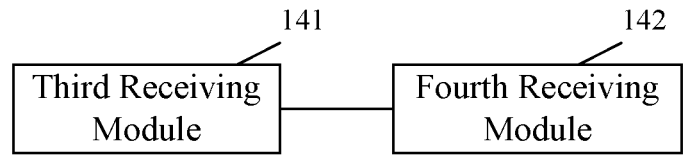
FIG. 14 is a schematic diagram illustrating a first apparatus for notifying service information change of multicast service set in a UE according to an embodiment of the present disclosure.

As shown in FIG. 14, a first apparatus for notifying service information change of multicast service is set in a UE side according to an embodiment of the present disclosure, including a third receiving module 141 and a fourth receiving module 142.

The third receiving module 141 is configured to receive change notification of single cell-multicast control channel SC-MCCH information.

The fourth receiving module 142 is configured to receive the SC-MCCH information according to the change notification of SC-MCCH information.

In an embodiment, the receiving, by the fourth receiving module, the SC-MCCH information according to the received change notification of SC-MCCH information includes:

The fourth receiving module receives, in a carrier carrying SC-MCCH, the SC-MCCH information in a SC-MCCH modification period corresponding to time of receiving the change notification of the SC-MCCH information, or in a SC-MCCH modification period after time of receiving the change notification of the SC-MCCH information.

In an embodiment, the receiving, by the fourth receiving module, the SC-MCCH information according to the received change notification of SC-MCCH information includes:

The fourth receiving module receives, when the SC-MCCH and SC-MTCH are on different carriers, update information of the SC-MCCH in agreed SC-MCCH modification period after receiving the change notification of SC-MCCH information.

In an embodiment, the receiving, by the fourth receiving module, the SC-MCCH information according to the received change notification of SC-MCCH information includes:

The UE where the fourth receiving module locates receives, when SC-MCCH information scheduling conflicts with SC-MTCH scheduling resource that the fourth receiving module receives currently in time-domain, the SC-MCCH information preferentially at least in the following cases:

When the change notification of SC-MCCH information indicates that change of content of the SC-MCCH information is related to the SC-MTCH, when MBMS service corresponding to the SC-MTCH is stopped, or when neighboring area information of the MBMS service corresponding to the SC-MTCH is changed.

Figure 15:
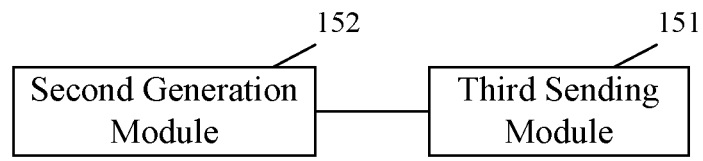
FIG. 15 is a schematic diagram illustrating a second apparatus for notifying service information change of multicast service set in an access network element according to an embodiment of the present disclosure.

As shown in FIG. 15, a second apparatus for notifying service information change of multicast service is set in an access network element side according to an embodiment of the present disclosure, including a third sending module 151.

The third sending module 151 is configured to send content of single cell-multicast control channel SC-MCCH information in a carrier scheduling single cell-multicast traffic channel SC-MTCH, and the SC-MCCH and the SC-MTCH are respectively carried and scheduled for sending on different carriers.

In an embodiment, the apparatus further includes a second generation module 152.

The second generation module 152 is configured to generate the SC-MCCH information.

In an embodiment, the content of the SC-MCCH information sent by the third sending module in the carrier scheduling the SC-MTCH includes one or more of the following cases:

The content of SC-MCCH information is the same as content of the SC-MCCH information carried by the SC-MCCH sent in the cell, and includes at least schedule information of all services that are currently sent in the cell;

The content of the SC-MCCH information related to the SC-MTCH includes one or more of: schedule information related to the SC-MTCH, identification information of MBMS service corresponding to this SC-MTCH, and neighboring area configuration information related to the MBMS service.

In an embodiment, the content of the SC-MCCH information sent by the third sending module includes at least one of the following ways:

In the first way: the third sending module sends DCI of physical downlink control channel PDCCH in scheduling period of the SC-MTCH, and the DCI of the PDCCH is scrambled by using dedicated RNTI, the DCI scrambled by the dedicated RNTI indicates schedule information of physical downlink shared channel PDSCH carrying message M;

In the second way: the third sending module sends DCI of PDCCH in the scheduling period for scheduling the SC-MTCH, and the DCI of the PDCCH is scrambled by using a RNTI that schedules the SC-MTCH; the access network element indicates that the content carried by the scheduled PDSCH is message M in the DCI;

In the third way: the third sending module sends the content of the SC-MCCH information by using a medium access control MAC layer control element CE; the content of the SC-MCCH information is encapsulated in the MAC CE, and the MAC CE is in a MAC protocol data unit PDU carrying the SC-MTCH data;

In the fourth way: message M, including the content of the SC-MCCH information, is carried in logical channel SC- MCCH by the third sending module, and SC-MCCH carrying the message M and SC-MTCH carrying service data multiplex MAC PDU by MAC layer multiplexing;

In the first way and the second way, the message M includes the content of the SC-MCCH information; the message M is carried by the logical channel SC-MCCH.

In an embodiment, in the first way and the second way, the number of repeated sending of the DCI of the PDCCH is indicated by a system information block and the SC-MCCH information; the number of repetition of the PDSCH carrying the message M is indicated by the system information block, the SC-MCCH information, or the DCI of the PDCCH.

Figure 16:
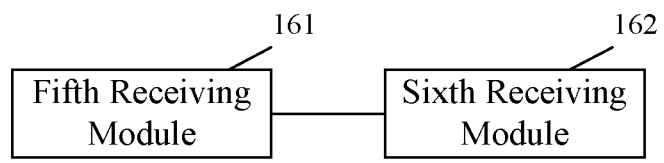
FIG. 16 is a schematic diagram illustrating a second apparatus for notifying service information change of multicast service set in a UE according to an embodiment of the present disclosure.

As shown in FIG. 16, the second apparatus for notifying service information change of multicast service is set in UE side according to an embodiment of the present disclosure, including a fifth receiving module 161.

The fifth receiving module 161 is configured to receive content of single cell-multicast control channel SC-MCCH information in a carrier scheduling single cell-multicast traffic channel SC-MTCH.

In an embodiment, the apparatus further includes a sixth receiving module 162.

The sixth receiving module 162 is configured to receive the SC-MTCH according to the S C-MCCH information.

In an embodiment, the receiving, by the fifth receiving module in a carrier scheduling SC-MTCH, content of SC-MCCH information includes at least one of the following ways:

When the fifth receiving module detects the DCI of PDCCH scrambled by dedicated RNTI in scheduling period of SC-MTCH, it determines that the content carried by PDSCH scheduled by the DCI is message M, the scheduling of the message M is treated as performing process of inactivity timer of the message M in a same way as one scheduling of SC-MTCH data, the message M includes part or all of the content of SC-MCCH information;

When the fifth receiving module detects that this scheduling content indicated by the DCI of PDCCH scheduling the SC-MTCH is message M in the scheduling period of SC-MTCH, it is determined that this scheduling content is the message M, the scheduling of the message M is treated as performing the process of inactivity timer of the message M in a same way as one scheduling of the SC-MTCH data;

The fifth receiving module receives the content of SC-MCCH information by receiving a medium access control MAC protocol data unit PDU of the SC-MTCH data;

After receiving the updated content of SC-MCCH information, the fifth receiving module applies the content of the received updated SC-MCCH information after the time boundary of the next SC-MCCH modification period.

Figure 17:
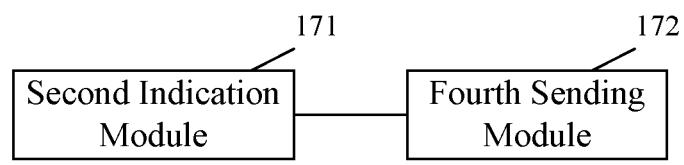
FIG. 17 is a schematic diagram illustrating a second apparatus for notifying service information of multicast service set in a core network element according to an embodiment of the present disclosure.

As shown in FIG. 17, the second apparatus for notifying service information of multicast service is set in a core network element side according to an embodiment of the present disclosure, including a second indication module 171 and a fourth sending module 172.

The second indication module 171 is configured to indicate, in MBMS session start request of control plane message, that MBMS service indicated in the control plane message has at least one of the following characteristics:

The MBMS service is a push type.

Updated notification of MBMS service information is required to be completed by a paging mechanism.

The MBMS service is an abrupt type.

The fourth sending module 172 is configured to send the MBMS session start request to an access network element.

In an embodiment, the second indication module is further configured to indicate parameter of the MBMS service in the MBMS session start request; the parameter includes but is not limited to one or more of: start time, SAI, and frequency information.

In an embodiment, the MBMS session start request is used to indicate that the access network element is processed according to the following way.

By scheduling the downlink control information DCI of the paging message or the paging message, in paging occasion within range of a hyper-system frame number H-SFN mod m=0 to H-SFN mod m=m−1, the user equipment UE is indicated to receive SC-MCCH information starting at time of the next H-SFN mod m=0 after time of receiving this DCI or the paging message; schedule information of the multicast service is indicated in the SC-MCCH information; the m is the maximum value of the eDRX period in the cell, or equal to 1024.

Although the embodiments disclosed in the present disclosure are disclosed as above in the preferred embodiments, the above description is only for the purpose of understanding the present disclosure, and is not intended to limit the disclosure. Any modification or variation in the form and details of the implementation may be made by those skilled in the art without departing from the spirit and scope of the disclosure. The patent protection scope of the present disclosure is subject to the scope defined by the appended claims.

INDUSTRIAL APPLICABILITY

A method for notifying service information of multicast service is provided by the embodiments of the present disclosure, the access network element sends update indication of multicast service information and indicates service information of multicast service to a user equipment UE, when scheduling the change notification of the SC-MCCH information, the access network element is not required to stagger the scheduling of all SC-MTCHs on different carriers in the time domain. A UE, that could not receive a plurality of carriers simultaneously, could also receive change notification of the SC-MCCH information on the carrier on which the SC-MTCH is received, so that the change of the SC-MCCH information is not missed.

What is claimed is:
1. A method for notifying service information change of multicast service, comprising:
sending, by an access network element, in downlink control information (DCI) of a physical downlink control channel (PDCCH) scheduling a single cell-multicast traffic channel (SC-MTCH) or in a medium access control (MAC) protocol data unit (PDU) carrying a SC-MTCH data, a change notification of single cell-multicast control channel (SC-MCCH) information, wherein the DCI comprises a one-bit indicator to indicate the SC-MCCH information has updated content related to the SC-MTCH;
wherein the updated content indicated by the access network element in the DCI of the PDCCH scheduling the SC-MTCH or in the MAC PDU carrying the SC-MTCH data comprises one or more combinations of the following:
a one-bit indicator to indicate whether update of the SC-MCCH information is related to the SC-MTCH, or to indicate whether the SC-MCCH information has the updated content related to the SC-MTCH; and a one-bit indicator to indicate whether there is updated content of the SC-MCCH information irrelevant to the SC-MTCH;

wherein the access network element sends the change notification of the SC-MCCH information in one or more of following cases:

when the SC-MCCH information is changed, the access network element indicates, in the DCI of the PDCCH scheduling the SC-MTCH or in the MAC PDU carrying the SC-MTCH data, the SC-MCCH information is changed;

when configuration information related to the SC-MTCH in the SC-MCCH information is changed, the access network element indicates, in the DCI of the PDCCH scheduling the SC-MTCH or in the MAC PDU carrying the SC-MTCH data, whether content of the SC-MCCH information has changed content related to the SC-MTCH;

when the content of the SC-MCCH information irrelevant to the SC-MTCH is changed, the access network element indicates, in the DCI of the PDCCH scheduling SC-MTCH or in the MAC PDU carrying the SC-MTCH data, that there is the updated content of the SC-MCCH information irrelevant to the SC-MTCH.

2. The method for notifying service information change of claim 1, wherein, the configuration information related to the SC-MTCH comprises: schedule information of the SC-MTCH, configuration information of a MBMS service corresponding to the SC-MTCH, and neighboring area configuration information of the MBMS service related to the SC-MTCH.

3. The method for notifying service information change of claim 1, wherein, timing at which the access network element sends the change notification of the SC-MCCH information comprises one or more of the following:

a SC-MCCH modification period in which the SC-MCCH information is changed; and a SC-MCCH modification period prior to the SC-MCCH modification period in which the SC-MCCH information is changed.

4. The method for notifying service information change of claim 1, wherein, the sending, by the access network element, in the DCI of the PDCCH scheduling the SC-MTCH, the change notification of the SC-MCCH information comprises:

sending, by the access network element, the DCI of the PDCCH that does not indicate schedule information of a physical downlink shared channel (PDSCH) carrying the SC-MTCH one or more times, but indicating the change notification of the SC-MCCH information in the DCI; wherein the DCI of the PDCCH is scrambled by using a Radio Network Tempory Identity (RNTI) that schedules the SC-MTCH, and is scheduled for sending by using configuration of scheduling period of the SC-MTCH.

5. An access network element device, comprising:
a memory, configured to store instructions; and
a processor, configured to execute the instructions to perform:
sending, in downlink control information (DCI) of a physical downlink control channel (PDCCH) scheduling a single cell-multicast traffic channel (SC-MTCH) or in a medium access control (MAC) protocol data unit (PDU) carrying a SC-MTCH data, a change notification of single cell-multicast control channel (SC-MCCH) information, wherein the DCI comprises a one-bit indicator to indicate the SC-MCCH information has updated content related to the SC-MTCH;

wherein the updated content indicated by the access network element in the DCI of the PDCCH scheduling the SC-MTCH or in the MAC PDU carrying the SC-MTCH data comprises one or more combinations of the following:

a one-bit indicator to indicate whether update of the SC-MCCH information is related to the SC-MTCH, or to indicate whether the SC-MCCH information has updated content related to the SC-MTCH; and a one-bit indicator to indicate whether there is updated content of the SC-MCCH information irrelevant to the SC-MTCH;

wherein the processor is configured to send the change notification of the SC-MCCH information in one or more of following cases:

when the SC-MCCH information is changed, the access network element indicates, in the DCI of the PDCCH scheduling the SC-MTCH or in the MAC PDU carrying the SC-MTCH data, the SC-MCCH information is changed;

when configuration information related to the SC-MTCH in the SC-MCCH information is changed, the access network element indicates, in the DCI of the PDCCH scheduling the SC-MTCH or in the MAC PDU carrying the SC-MTCH data, whether content of the SC-MCCH information has changed content related to the SC-MTCH;

when the content of the SC-MCCH information irrelevant to the SC-MTCH is changed, the access network element indicates, in the DCI of the PDCCH scheduling SC-MTCH or in the MAC PDU carrying the SC-MTCH data, that there is updated content of the SC-MCCH information irrelevant to the SC-MTCH.

6. The device of claim 5, wherein,
the configuration information related to the SC-MTCH comprises: schedule information of the SC-MTCH, configuration information of a MBMS service corresponding to the SC-MTCH, and neighboring area configuration information of the MBMS service related to the SC-MTCH.

7. The device of claim 5, wherein, timing at which the processor sends the change notification of the SC-MCCH information comprises one or more of the following:

a SC-MCCH modification period in which the SC-MCCH information is changed; and a SC-MCCH modification period prior to the SC-MCCH modification period in which the SC-MCCH information is changed.

8. The device of claim 5, wherein, the processor configured to perform sending, in the DCI of the PDCCH scheduling the SC-MTCH, the change notification of the SC-MCCH information through the following manner:

sending, the DCI of the PDCCH that does not indicate schedule information of a physical downlink shared channel (PDSCH) carrying the SC-MTCH one or more times, but indicating the change notification of the SC-MCCH information in the DCI; wherein the DCI of the PDCCH is scrambled by using a Radio Network Tempory Identity (RNTI) that schedules the SC-MTCH, and is scheduled for sending by using configuration of scheduling period of the SC-MTCH.

9. A user equipment, comprising:
a memory, configured to store instructions; and
a processor, configured to execute the instructions to perform:

receiving, in downlink control information (DCI) of a physical downlink control channel (PDCCH) scheduling a single cell-multicast traffic channel (SC-MTCH) or in a medium access control (MAC) protocol data unit (PDU) carrying a SC-MTCH data, a change notification of single cell-multicast control channel (SC-MCCH) information; and receiving the SC-MCCH information based on the change notification of the SC-MCCH information;

wherein the DCI comprises a one-bit indicator to indicate the SC-MCCH information has updated content related to the SC-MTCH;

wherein the updated content indicated in the DCI of the PDCCH scheduling the SC-MTCH or in the MAC PDU carrying the SC-MTCH data comprises one or more combinations of the following:

a one-bit indicator to indicate whether update of the SC-MCCH information is related to the SC-MTCH, or to indicate whether the SC-MCCH information has the updated content related to the SC-MTCH; and a one-bit indicator to indicate whether there is updated content of the SC-MCCH information irrelevant to the SC-MTCH;

wherein the receiving the change notification of SC-MCCH information in one or more of following cases:

when the SC-MCCH information is changed, receiving, in the DCI of the PDCCH scheduling the SC-MTCH or in the MAC PDU carrying the SC-MTCH data, an indication about the SC-MCCH information is changed;

when configuration information related to the SC-MTCH in the SC-MCCH information is changed, receiving, in the DCI of the PDCCH scheduling the SC-MTCH or in the MAC PDU carrying the SC-MTCH data, an indication about whether content of the SC-MCCH information has changed content related to the SC-MTCH;

when the content of the SC-MCCH information irrelevant to the SC-MTCH is changed, receiving, in the DCI of the PDCCH scheduling SC-MTCH or in the MAC PDU carrying the SC-MTCH data, an indication about that there is the updated content of the SC-MCCH information irrelevant to the SC-MTCH.

10. The user equipment of claim 9, wherein, the processor configured to perform receiving the SC-MCCH information based on the received change notification of the SC-MCCH information comprising:

receiving, in a carrier carrying SC-MCCH, the SC-MCCH information in a SC-MCCH modification period corresponding to time of receiving the change notification of the SC-MCCH information, or in the SC-MCCH modification period after receiving the change notification of the SC-MCCH information.

11. The user equipment of claim 9, wherein, the processor configured to perform receiving the SC-MCCH information based on the received change notification of the SC-MCCH information through the following manner:

when the SC-MCCH and the SC-MTCH being on different carriers, receiving update information of the SC-MCCH in agreed SC-MCCH modification period after receiving the change notification of the SC-MCCH information.

12. The user equipment of claim 9, wherein, the processor configured to perform receiving the SC-MCCH information based on the received change notification of the SC-MCCH information through the following manner:

in response to the SC-MCCH information scheduling conflicting with SC-MTCH scheduling resource that the UE receives currently in time-domain, receiving the SC-MCCH information preferentially at least in the following cases:

in a case where the change notification of the SC-MCCH information indicates that changed content of the SC-MCCH information is related to the SC-MTCH;

in a case where a MBMS service corresponding to the SC-MTCH is stopped; or in a case where neighboring area information of the MBMS service corresponding to the SC-MTCH is changed.

\* \* \* \* \*